(12) United States Patent
Meng et al.

(10) Patent No.: US 11,845,448 B2
(45) Date of Patent: Dec. 19, 2023

(54) SYSTEM AND METHOD FOR RECALIBRATION OF AN UNCALIBRATED SENSOR

(71) Applicant: Pony AI Inc., Grand Cayman (KY)

(72) Inventors: Pingfan Meng, Dublin, CA (US); Zhenhao Pan, Sunnyvale, CA (US)

(73) Assignee: Pony AI Inc., Grand Cayman (KY)

( * ) Notice: Subject to any disclaimer, the term of this patent is extended or adjusted under 35 U.S.C. 154(b) by 140 days.

(21) Appl. No.: 17/474,368

(22) Filed: Sep. 14, 2021

(65) Prior Publication Data

US 2021/0403007 A1    Dec. 30, 2021

Related U.S. Application Data

(63) Continuation of application No. 16/407,060, filed on May 8, 2019, now Pat. No. 11,117,591.

(51) Int. Cl.
  *B60W 50/00*       (2006.01)
  *G01D 18/00*       (2006.01)
  *G05D 1/00*        (2006.01)

(52) U.S. Cl.
  CPC .......... *B60W 50/00* (2013.01); *G01D 18/004* (2013.01); *B60W 2050/0083* (2013.01); *B60W 2555/20* (2020.02); *G05D 1/0088* (2013.01)

(58) Field of Classification Search
  CPC ............. B60W 50/00; B60W 2555/20; B60W 2050/0083; G01D 18/004; G05D 1/0088
  See application file for complete search history.

(56) References Cited

U.S. PATENT DOCUMENTS

| | | | |
|---|---|---|---|
| 7,983,802 B2 | 7/2011 | Breed | |
| 9,840,254 B2 | 12/2017 | Gupta et al. | |
| 10,268,203 B2 | 4/2019 | Wisniowski | |
| 10,430,970 B2 | 10/2019 | Bier | |
| 11,609,315 B2* | 3/2023 | Rohatgi | ............... G01S 17/931 |
| 2006/0089767 A1* | 4/2006 | Sowa | ..................... G01M 15/05 701/1 |
| 2013/0173109 A1 | 7/2013 | Hukkeri et al. | |
| 2014/0095016 A1* | 4/2014 | Suganuma | ............... G07C 5/00 701/32.1 |
| 2016/0129917 A1* | 5/2016 | Gariepy | ............... G05D 1/0246 701/2 |

(Continued)

FOREIGN PATENT DOCUMENTS

| | | | |
|---|---|---|---|
| EP | 1039390 A1 * | 9/2000 | .......... G06F 11/2257 |
| WO | 2018142057 A1 | 8/2018 | |

OTHER PUBLICATIONS

Roumeliotis et al., "Sensor Fault Detection and Identification in a Mobile Robot", 1998, IEEE (Year: 1998).*

(Continued)

*Primary Examiner* — Hussein Elchanti
*Assistant Examiner* — Kenneth M Dunne

(57) ABSTRACT

A system comprises a sensor system comprising a sensor and an analysis engine configured to determine whether the sensor is uncalibrated. The system further comprises an error handling system configured to determine whether to perform a recalibration in response to the sensor system determining that the sensor is uncalibrated. The error handling system further comprises a recalibration engine configured to perform a recalibration.

19 Claims, 12 Drawing Sheets

(56) References Cited

U.S. PATENT DOCUMENTS

| | | | |
|---|---|---|---|
| 2016/0288799 A1* | 10/2016 | Nguyen Van | B60W 30/09 |
| 2016/0301923 A1* | 10/2016 | Ichige | H04N 23/80 |
| 2016/0370334 A1* | 12/2016 | van Tol | G01N 33/0008 |
| 2017/0169627 A1* | 6/2017 | Kim | G01S 13/862 |
| 2017/0291600 A1* | 10/2017 | Styles | F02D 41/021 |
| 2018/0045519 A1 | 2/2018 | Ghadiok | |
| 2018/0050704 A1* | 2/2018 | Tascione | B60W 10/04 |
| 2018/0307238 A1 | 10/2018 | Wisniewski | |
| 2019/0109988 A1* | 4/2019 | Lin | H04N 23/811 |
| 2019/0196481 A1 | 6/2019 | Tay | |
| 2019/0204425 A1 | 7/2019 | Abari et al. | |
| 2019/0353502 A1 | 11/2019 | Doshi | |
| 2019/0369234 A1 | 12/2019 | Wetoschkin | |
| 2020/0005489 A1 | 1/2020 | Kroeger | |
| 2020/0019160 A1* | 1/2020 | McArthur | G01S 17/87 |
| 2020/0124447 A1* | 4/2020 | Schwindt | G01S 15/931 |
| 2020/0184236 A1* | 6/2020 | Aguiar | G06T 7/80 |
| 2020/0193643 A1 | 6/2020 | Hess | |
| 2020/0209848 A1* | 7/2020 | Mercep | G01S 13/931 |
| 2020/0211226 A1 | 7/2020 | Kundu | |
| 2021/0276579 A1* | 9/2021 | Mielenz | G01S 7/4972 |

OTHER PUBLICATIONS

Sciencedirect, "Program Execution Time", 2014, ScienceDirect, pp. 1-9 (Year: 2014).*

Machine translation of EP 1039390 A1 (Year: 2000).*

* cited by examiner

500

| Front passenger side camera | | | | | | |
|---|---|---|---|---|---|---|
| Previous recalibrations | First recalibration 5/18/2016 2:30 PT | Successful | Landmark used: stop sign at 123 First St. | Brightness of landmark: 3.2 EV | Ambient light: 10 lux | Amount of recalibration 10 degrees |
| History of sensor | First used 9/15/2015 1:00 PT | Recalibrations Successful: 15/20 | Second Recalibrations Successful: 5/5 | | | |

| Driver side Lidar sensor | | | | | | |
|---|---|---|---|---|---|---|
| Previous recalibrations | First recalibration 7/13/2016 2:30 PT | Successful | Landmark used: traffic light at 210 Second St. | Brightness of landmark: 2.7 EV | Ambient light: 8 lux | Amount of recalibration 7 degrees |
| History of sensor | First used 9/15/2015 1:00 PT | Recalibrations Successful: 7/9 | Second Recalibrations Successful: 4/5 | | | |

| Passenger side radar sensor | | | | | | |
|---|---|---|---|---|---|---|
| Previous recalibrations | First recalibration 10/13/2015 5:00 PT | Successful | Landmark used: traffic light at 300 Third St. | Brightness: 3.0 EV | Ambient light: 7 lux | Amount of recalibration 6 degrees |
| History of sensor | First used 9/15/2015 1:00 PT | Recalibrations Successful: 10/17 | Second Recalibrations Successful: 3/5 | | | |

FIG. 5

SYSTEM AND METHOD FOR RECALIBRATION OF AN UNCALIBRATED SENSOR

CROSS-REFERENCE TO RELATED APPLICATIONS

This application is a continuation of U.S. patent application Ser. No. 16/407,060, filed May 8, 2019, and entitled "SYSTEM AND METHOD FOR RECALIBRATION OF AN UNCALIBRATED SENSOR," which is incorporated herein by reference in its entirety.

TECHNICAL FIELD

The present disclosure relates generally to vehicles equipped with sensors useful for driving assistance or autonomous driving, and in particular, some embodiments relate to sensor validation and/or sensor calibration of a vehicle.

BACKGROUND

On-board sensors in vehicles, such as autonomous vehicles (AVs), supplement and bolster the vehicle's field of vision by providing accurate sensor data. Sensor data is used, for example, in applications of blind spot detection, lane change assisting, read end radar for collision warning or collision avoidance, park assisting, cross-traffic monitoring, brake assisting, emergency braking, and/or automatic distance controlling. Examples of on-board sensors include, for example, passive sensors and active sensors. On-board sensors include camera, Lidar, radar, GPS, sonar, ultrasonic, IMU (inertial measurement unit), accelerometers, gyroscopes, magnetometers, and FIR (far infrared) sensors. Sensor data may include image data, reflected laser data, and/or the like. Often, images captured by the on-board sensors utilize a coordinate system to determine the distance and angle of the contents and objects captured in the image. Such real-time space information may be acquired near the vehicle using various on-board sensors located throughout the vehicle, which may then be processed to calculate and to determine the safe driving operation of the vehicle. On-board sensors may be subject to spectral distribution, ambient light, specular reflections, and other optical phenomena. Sensors may also move out of alignment over time and need to be recalibrated. If left uncalibrated, the accuracy of information obtained from the sensors may be compromised. Therefore, it is imperative that the on-board sensors are mounted and adequately calibrated to the correct location, placement, and angle in order for the on-board sensors to properly detect and measure objects without error.

Currently, as an example, calibration panels are installed in select areas (e.g., garage) to calibrate the on-board sensors. However, calibration panels require not only the installation of hardware, but also severely restrict the number of calibrations that may be performed throughout the day, especially since the vehicle must be parked or stationed near the calibration panel. As a result, the on-board cameras may then go uncalibrated for an extended period of time. Additionally, conventional sensor systems for an AV continuously collect sensor data from all around the AV, regardless of the behavior of the vehicle or the need to collect all the sensor data. This can place a large computational burden on the sensor systems, as well as the other systems of the AV. For example, all of the sensor data must typically be transmitted to a central computing system of the AV, and the central computing system must process all of the sensor data. Harnessing and interpreting vast volumes of information collected by an AV poses design challenges. The sheer quantity of data (e.g., captured image data, map data, GPS data, sensor data, etc.) that an AV may need to analyze, access, and/or store poses challenges that can limit or adversely affect navigation.

SUMMARY

Described herein are systems and methods for determining whether sensors in a vehicle are calibrated, determining whether the sensors are to be recalibrated, and recalibrating the sensors, that are more convenient and reduce a computational burden on the sensor system, such as an AV sensor system. Various embodiments of the present disclosure provide a system comprising a sensor system and an error handling system. The sensor system comprises a sensor and an analysis engine configured to determine whether the sensor is uncalibrated. The error handling system is configured to determine whether to perform a recalibration in response to the sensor system determining that the sensor is uncalibrated. The error handling system further comprises a recalibration engine configured to perform the recalibration in response to determining, by the error handling system, that the recalibration is to be performed.

In some embodiments, the error handling system is configured to determine whether to perform the recalibration based on an amount of an error or a frequency of an error occurrence in the sensor.

In some embodiments, in response to the error handling system determining that a recalibration is to be performed, the error handling system is configured to determine a mode of recalibration to be performed on the sensor based on an amount of an error, a frequency of an error, or a history of the sensor.

In some embodiments, the system further comprises a memory accessible by the recalibration engine, the memory including one or more results of previous recalibrations of the sensor, each of the one or more results indicating whether a previous recalibration was successful, a method of recalibration used in the previous recalibration, a time of the previous recalibration, an amount of ambient light at the time of the previous recalibration, a brightness of a landmark used in the previous recalibration, a location of the landmark, a load consumption of the recalibration, a modality of the sensor, or an age of the sensor.

In some embodiments, in response to the analysis engine determining that the sensor is uncalibrated, the error handling system further determines whether the sensor requires immediate recalibration. In response to the error handling system determining that the sensor does not require immediate recalibration, the recalibration engine selects, among landmarks located along a route to be travelled and stored in the memory, a landmark to be used for the recalibration based on the one or more results of previous recalibrations.

In some embodiments, the recalibration engine selects a landmark having a highest previous rate of success of recalibration with the sensor or a landmark having a highest previous rate of success of recalibration with one or more sensors having a same modality as the sensor.

In some embodiments, the recalibration engine selects a landmark that, when used for the recalibration, requires a minimum load for the recalibration compared to other landmarks, or a landmark having a nearest location compared to other landmarks.

In some embodiments, in response to the error handling system determining that the sensor requires immediate recalibration, the recalibration engine selects the landmark having a nearest location along the route to be travelled.

In some embodiments, in response to the analysis engine determining that the sensor is not validated after the recalibration, the error handling system further determines whether to perform a second recalibration. In response to the error handling system determining the second recalibration is to be performed, the recalibration engine performs the second recalibration with a landmark of a same type as the landmark used in the recalibration.

In some embodiments, in response to the error handling system determining to perform the second recalibration, the error handling system determines whether the second recalibration is to be performed immediately. In response to the error handling system determining that the second recalibration is not to be performed immediately, the recalibration engine selects, among landmarks located along a route to be travelled and stored in the memory, the landmark to be used for the second recalibration based on the one or more results of previous recalibrations.

Various embodiments of the present disclosure provide an error handling method for a sensor of a system. The method comprises, determining, by a sensor system, whether the sensor is uncalibrated. The method comprises, determining, by an error handling system, whether to perform a recalibration in response to the sensor system determining that the sensor is uncalibrated. The method comprises, performing, by a recalibration engine of the error handling system, a recalibration in response to the error handling system determining that the recalibration is to be performed.

In some embodiments, the determining whether to perform the recalibration is based on an amount of an error or a frequency of an error occurrence in the sensor.

In some embodiments, the method further comprises, in response to the error handling system determining that a recalibration is to be performed, determining a method of recalibration to be performed on the sensor based on an amount of an error, a frequency of an error, or a history of the sensor.

In some embodiments, the performing the recalibration comprises accessing a memory including one or more results of previous recalibrations of the sensor. Each of the one or more results indicates whether a previous recalibration was successful, a method of recalibration used in the previous recalibration, a time of the previous recalibration, an amount of ambient light at the time of the previous recalibration, a brightness of a landmark used in the previous recalibration, a location of the landmark, a load consumption of the recalibration, a modality of the sensor, or an age of the sensor.

In some embodiments, the method further comprises, in response to the analysis engine determining that the sensor is uncalibrated, determining, by the error handling system, whether the sensor requires immediate recalibration. The method further comprises, in response to the error handling system determining that the sensor does not require immediate recalibration, selecting, by the recalibration engine, among landmarks located along a route to be travelled and stored in the memory, a landmark to be used for the recalibration based on the one or more results of previous recalibrations.

In some embodiments, the selecting the landmark comprises selecting a landmark having a highest previous rate of success of recalibration with the sensor or a landmark having a highest previous rate of success of recalibration with one or more sensors having a same modality as the sensor.

In some embodiments, the selecting the landmark comprises selecting a landmark that, when used for the recalibration, requires a minimum load for the recalibration compared to other landmarks, or a landmark having a nearest location compared to other landmarks.

In some embodiments, the method further comprises, in response to the error handling system determining that the sensor requires immediate recalibration, selecting the landmark having a nearest location along the route to be travelled.

In some embodiments, the method further comprises, in response to the analysis engine determining that the sensor is not validated after the recalibration, determining, by the error handling system, whether to perform a second recalibration. In some embodiments, the method further comprises, in response to determining that a second recalibration is to be performed, performing the second recalibration using a landmark of a different type as the landmark used in the recalibration.

In some embodiments, the method further comprises, in response to the error handling system determining that the second recalibration is to be performed, determining, by the error handling system, whether the second recalibration is to be performed immediately. In some embodiments, the method further comprises, in response to the error handling system determining that the second recalibration is not to be performed immediately, selecting, by the recalibration engine, among landmarks located along a route to be travelled and stored in the memory, a landmark to be used for the second recalibration based on the one or more results of previous recalibrations.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 5 depicts a flowchart of an example of a recalibration method according to some embodiments.

DETAILED DESCRIPTION

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments of the present disclosure provide systems and methods for calibrating or recalibrating sensors mounted on vehicles, such as an AV. The embodiments provide effective and efficient systems and methods which minimize a computation load of the sensor system while effectively ensuring detection of a need for calibration and implementing calibration/recalibration of the system sensors.

Figure 1:
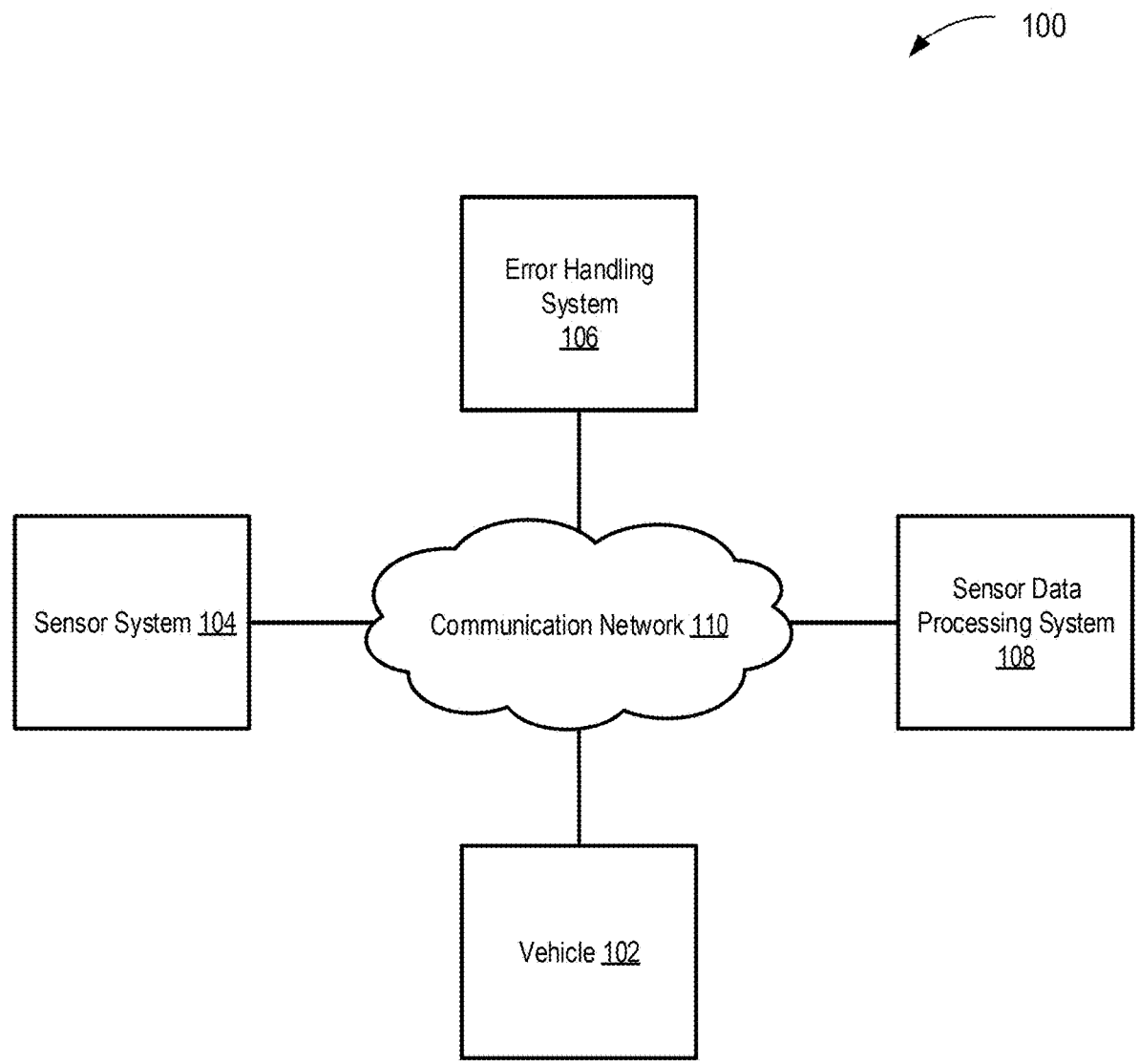
FIG. 1 depicts a diagram of an example system for calibrating sensors in a vehicle according to some embodiments.

Various embodiments described herein are directed to a system and a method for calibrating sensors in a vehicle, such as an AV. FIG. 1 depicts a diagram 100 of an example system for calibrating sensors in a vehicle, such as an AV, according to some embodiments. In the example of FIG. 1, the system includes a vehicle 102, a sensor system 104, an error handling system 106, a sensor data processing system 108, and a communication network 110. In various embodiments, the systems 104-108 and the communication network 110 are implemented as part of the vehicle 102. The vehicle 102 may be capable of sensing its environment and/or navigating with a limited human input or without human input. The vehicle discussed in this paper typically includes a vehicle that travels on the ground (e.g., car, truck, bus), but may also include a vehicle that travels in the air (e.g., drones, helicopter, airplanes, and so on), travels on water (e.g., a boat), and/or the like. The vehicle discussed in this paper may or may or accommodate one or more passengers therein.

The sensor system 104 may function to selectively capture sensor data. The sensor system 104 may be mounted on one or more portions (e.g., exterior surfaces, interior surfaces) of a vehicle, and may include a sensor, or one or more sensors. As used herein, sensors may include laser scanning systems (e.g., Lidar systems), radar systems, cameras, GPS, sonar, ultrasonic, IMU, accelerometers, gyroscopes, magnetometers, and FIR (far infrared) sensors and/or the like. One or more of the sensors can be combined in a single component. The sensor system 104 may be configured to capture sensor data, for example, first data and second data. Cameras and other optical sensors can capture image data using charge coupled devices (CCDs), complementary metal oxide semiconductors (CMOS), or similar elements. Radar systems and laser scanning systems may identify objects in the vicinity of the vehicle. The sensor or one or more sensors may detect vehicle speed, vehicle direction, vehicle acceleration, vehicle rotation, vehicle location, environmental weather conditions, traffic conditions, and road conditions. The first and the second data may be captured from different sensors at a same time, a same sensor at different, sequential times, or different sensors at different, sequential times. Sequential may mean directly before or directly afterwards, for example, in a continuous sampling manner, such as referring to continuous sampling points. The different sensors may be sensors of a same or a different modality. The sensor data may include an image captured from the one or more sensors, one or more specific features (such as trees, road, grass, landmarks, people, inanimate objects) extracted from the image. The sensor data may be further processed to obtain or estimate one or more parameters, and the like. The sensor data may be further processed to obtain an image histogram of a graphical representation of tonal distribution in an image. The one or more parameters may include information of the sensor that may be compared with known parameters from manufacturer specifications. Such parameters may include information generated from a statistical analysis of the data. Such parameters may include an optical center, a focal length, a skew, a distortion, an image center, a depth of field, an angle of view, a beam angle, an aspect ratio, and a pixel number, a level of noise, and the like.

The sensor system 104 may periodically determine whether the sensor or the one or more sensors is calibrated. For example, the sensor system 104 may check calibration at fixed periods and/or following abnormal occurrences such as a bump or pothole in a road, which, for example may be detected by an IMU.

The sensor system 104 may be configured to analyze and/or process the sensor data. For example, the sensor system 104 may be configured to determine or estimate a parameter from the sensor data (e.g., via processing of the sensor data) and compare the parameter to a known parameter. For example, the sensor system 104 may be configured to process the sensor data into an image histogram of a graphical representation of tonal distribution in an image captured by the one or more sensors. In some embodiments, the known parameter is from manufacturer specifications or obtained after processing of historical data.

In some embodiments, the sensor system 104 determines whether the sensor is calibrated. In some embodiments, the sensor system 104 determines a probability of the sensor being uncalibrated. In some embodiments, the sensor system 104 determines an amount of sensor error or a degree of deviation of the sensor before recalibration attempts and after recalibration attempts. To determine whether the sensor is calibrated, or a probability of the sensor being uncalibrated, in some embodiments, the sensor system 104 determines a difference between the determined or estimated parameter and the known parameter. If the difference between the determined or estimated parameter and the known parameter exceeds a first threshold, the sensor system 104 determines that the sensor from which the sensor data originated is uncalibrated. For example, the sensor system 104 may be configured to process the sensor data to determine a smoothness of the generated image histogram as mentioned above. If the smoothness of the image histogram deviates from a smoothness of a reference histogram by more than a first threshold, then the sensor system 104 may determine that the sensor is uncalibrated. In some embodiments, if the difference between the determined or estimated parameter and the known parameter is below a second threshold, the sensor system 104 determines that the sensor is calibrated. In some embodiments, if the difference between the determined or estimated parameter and the known parameter exceeds a first threshold but is less than a second threshold, the sensor system 104 determines that further validation may be desired, to determine whether the sensor is calibrated.

In some embodiments, the sensor system 104 determines a probability of the sensor being uncalibrated. In some embodiments, the sensor system 104 determines an amount of sensor error or a degree of deviation of the sensor before recalibration attempts and/or after recalibration attempts. For example, the sensor system 104 may determine an angular offset, a hinge angle offset, bias error, scale factor, error, non-linearity, noise, misalignment, offset, or laser offset, or any combination thereof.

In some embodiments, the sensor data may be validated based on historical data. Historical data may refer to, as an example, an image, or one or more specific features of the image (e.g., including houses, dwellings, roads, signs, monuments, landmarks, etc). The image (e.g., of the historical data) may be captured at a specific location, for example, taken at a same location as the sensor data. Historical data may be information already verified to be accurate. Historical data may be images from other sensors and/or onboard 3D map data. As an example, how closely the sensor data matches with the historical data may be a basis for determining whether the sensor in question (the sensor that captured the sensor data) is uncalibrated. As an example, how closely the sensor data matches with the historical data may be based on a proportion of features present in the historical data that are also in common with the sensor data, or, of the features that are in common between the historical data and the sensor data, how closely each of the features matches (e.g. a degree of similarity between each of the features).

In some embodiments, the sensor system 104 may be configured to determine a proportion of the one or more features of the historical data that matches the one or more features of the sensor data and determine whether the proportion is less than a third threshold. For example, the sensor system 104 may determine whether one or more common feature(s) (such as a tree, monument, road, grass, landmark, person, inanimate object) is present in both the sensor data and the historical data. If the proportion is less than a third threshold, the sensor system 104 may determine that further validation is desired before determining whether the sensor is calibrated. In other embodiments, the sensor system 104 may determine that the sensor is uncalibrated. In other embodiments, in addition or in place of determining whether the proportion is less than the third threshold, the sensor system 104 may test or determine validation on the basis of individual features of the historical data. For example, of the features of the historical data that matches the one or more features of the sensor data, the sensor system 104 may select one, some, or all of the aforementioned matching features, and determine how closely each of the selected feature(s) matches between the historical data and the sensor data (e.g. a degree of similarity between each of the features). If each of the selected feature(s) matches sufficiently between the historical data and the sensor data, the sensor system 104 may determine that the sensor is calibrated. If some or all of the selected features(s) does not sufficiently match between the historical data and the sensor data, the sensor system 104 may determine that further validation is desired, or that the sensor is uncalibrated. For example, if one, some, or all of the features of the historical data exhibits a similarity with the sensor data of greater than a third threshold, the sensor system 104 may determine that the sensor is calibrated. In some embodiments, if the similarity is less than a fourth threshold, the sensor system 104 may determine that the sensor is uncalibrated, or that further testing may be desired to determine whether the sensor is calibrated. In some embodiments, if the similarity is between a third and fourth threshold, the sensor system 104 may determine that further testing may be desired.

For example, if historical data includes a feature (e.g., a building) that is not present in the sensor data, the discrepancy may be a result of the sensor being uncalibrated, or the sensor may be calibrated but the building is no longer present. In such scenario, further testing or validation may be desired to determine whether the sensor is uncalibrated. For example, further testing or validation may be done on the basis of second data taken at a different time and/or by a different sensor.

In some embodiments, the sensor system 104 may use or further process the historical data and/or the sensor data to determine whether any boundaries are present (such as between natural objects, for example, grass and road, sky and mountain, sky and ground). In some embodiments, one or more of the boundaries between the historical data and the sensor data may be analyzed for similarities and differences. In some embodiments, if one, some, or all of the boundaries between the historical data and the sensor data have a similarity exceeding a third threshold, the sensor system 104 determines that the sensor is calibrated. In some embodiments, if one, some, or all of the boundaries between the historical data and the sensor data have a similarity lower than a fourth threshold, the sensor system 104 determines that the sensor is uncalibrated, or that further testing is desired to determine whether the sensor is calibrated.

The sensor system 104 may be further configured to validate the sensor data (e.g., first data) using, or based on, second data. The second data may be captured from a different sensor at a same time, a same sensor at a different, sequential time, or a different sensor at a different, sequential time. The different sensors may be sensors of a same or different modality.

In some embodiments, the sensor system 104 may conduct a single validation, for example, based on a comparison of a computation load of each of possible validations. For example, the sensor system 104 may initially select only a validation that consumes or requires a minimum (least) computation load. In some embodiments, the sensor system 104 may first conduct a single validation. The sensor system 104 may then select a further validation based on which further validation consumes or requires a minimum computation load.

In some embodiments, the sensor system 104 may schedule a series of validations. In some embodiments, the sensor system 104 may conduct the aforementioned validations (known parameter, historical data, second data) in parallel or sequentially. For example, the sensor system 104 may conduct the aforementioned validations substantially simultaneously or independent of one another. As another example, the aforementioned validations may be dependent on one another. The sensor system 104 may conduct the aforementioned validations in any combination and in any sequential order. For example, the sensor system 104 may conduct the validation with the historical data first, the validation of the second data next, and the validation with the known parameter last. In some embodiments, the sensor system 104 may conduct a validation only if it is determined to be desired. In some embodiments, the sensor system 104 may conduct only a single validation.

In some embodiments, if further validation is determined to be desired, the sensor system 104 may be configured to validate the sensor data with data captured from a different sensor at a same time, a same sensor at a different, sequential time, or a different sensor at a different, sequential time. The different sensors may be sensors of a same or different modality. In some embodiments, the data captured from a different sensor and/or at a different time is verified (e.g., as historical data and saved in memory). In other embodiments, the data captured from a different sensor and/or at a different time is not verified.

In some embodiments, the sensor system 104 may attempt to validate the sensor again, e.g., after recalibration efforts, using a same validation or sequence of validation as was done to determine whether the sensor is calibrated. In some embodiments, after recalibration efforts, the sensor system 104 may attempt to validate the sensor again using a different validation or sequence of validation. For example, the sensor system 104 may conduct validation based on the second data instead of conducting the first validation after recalibration efforts. In some embodiments, the sensor system 104 may select a validation or validations after recalibration efforts based on which validation or validations consumes or requires a least system load on the sensor system 104. In some embodiments, after the sensor system 104 conducts the validation after recalibration attempt by the error handling system 106, the sensor system 104 saves a result of the recalibration of the sensor in a memory. The result may comprise whether the recalibration was successful or specific data of the recalibration, such as data before the recalibration and data after the recalibration. The result may further comprise a location or a specific landmark used for the recalibration.

In some embodiments, the error handling system 106 may be a module. In some embodiments, the error handling system 106 may select from one of: initiating a backup sensor, and recalibrating the sensor. In some embodiments, the error handling system 106 may select from one of: eliminating data determined to be erroneous from the sensor, issuing an alert to a user, initiating a backup sensor, and recalibrating the sensor. In some embodiments, the error handling system 106 may select from any combination of: eliminating data determined to be erroneous from the sensor, issuing an alert to a user, initiating a backup sensor, and recalibrating the sensor. In some embodiments, the error handling system 106 may be configured to eliminate data determined to be erroneous. In some embodiments, the error handling system 106 may be configured to eliminate only data determined to be erroneous while retaining the correct data. For example, if only a portion of an image is determined to be erroneous, the error handling system 106 may eliminate only the portion determined to be erroneous while retaining the remainder of the image. In some embodiments, the error handling system 106 may be configured to initiate a backup sensor to operate, for example, until the uncalibrated sensor is successfully recalibrated. In some embodiments, the error handling system 106 may be configured to initiate a backup sensor if a backup sensor is available, rather than recalibrating the sensor. In some embodiments, the error handling system 106 may be configured to initiate a backup sensor if a backup sensor is available and if the backup sensor is calibrated. In some embodiments, the backup sensor is of a same modality as the uncalibrated sensor. In some embodiments, the backup sensor is of a different modality as the uncalibrated sensor. In some embodiments, the error handling system 106 may be configured to recalibrate the sensor. For example, the error handling system 106 may be configured to recalibrate the sensor based on a landmark. In some embodiments, the error handling system 106 may be configured to issue an alert of an uncalibrated sensor or potentially uncalibrated sensor.

In some embodiments, the error handling system 106 may be configured to use an error handling method or combination of methods that consumes a minimum system load on the error handling system 106, the sensor system 104, or the overall system. In some embodiments, the error handling system 106 may be configured to select an error handling method or methods based on a load consumption of the method or methods, an amount of availability of a system load, a history of the sensor, an availability of a backup sensor, a density of moving objects detected at a current location, a weather condition at the current location, or an environment condition at the current location. In some embodiments, the error handling system 106 is configured to select an error handling method based on the one or more results of previous error handling of the sensor, for example, stored in memory. For example, the selecting an error handling method may be based on a method that has a highest rate of success for that particular sensor or a sensor of that modality. As another example, the selecting an error handling method may be based on a method that has a highest increasing rate of success or a lowest decreasing rate of success for that particular sensor or a sensor of that modality. For example, the error handling method selected may be a method that has shown a best trend of success rate, such as, for example, the method that has shown a rate of success that has decreased less than other methods, or a rate of success that has increased more than other methods. In some embodiments, the selection of the error handling method or methods by the error handling system 106 may be based on any combination of the aforementioned factors. In some embodiments, if previous rate of success of recalibration is greater than a threshold (e.g. a fifth threshold), the error handling system 106 chooses recalibration as the method. In some embodiments, if previous rate of success of recalibration is lower than a threshold (e.g. a fifth threshold), the error handling system 106 does not choose recalibration as the error handling method but instead chooses initiating a backup sensor as the error handling method. In some embodiments, a previous rate of success of recalibration is measured based on or relative to a specific location, landmark, or type of landmark (e.g., traffic sign, light). For example, if a previous rate of success of recalibration specifically at a traffic light is lower than a threshold (e.g. a fifth threshold), the error handling system 106 does not choose recalibration as the error handling method.

In some embodiments, the error handling system 106 may be configured to determine whether to perform a recalibration in response to the sensor system 104 determining that the sensor is uncalibrated. In some embodiments, the error handling system 106 may be configured to determine whether to perform the recalibration based on an amount of an error or a frequency of an error occurrence in the sensor. For example, if an amount of an error is greater than a threshold (e.g. a sixth threshold), or a frequency of an error occurrence is greater than a threshold (e.g. a seventh threshold), the error handling system 106 may determine that recalibration is to be performed on the sensor. In some embodiments, the error handling system 106 may be configured to determine whether to perform the recalibration based on a combination of an amount of error and a frequency of an error occurrence, or one of an amount of error and a frequency of an error occurrence. An amount of an error may be determined by the sensor system 102 and measured by, for example, an angular offset, a hinge angle offset, bias error, scale factor, error, non-linearity, noise, misalignment, offset, or laser offset, or any combination thereof, or the like.

In response to the error handling system 106 determining that a recalibration is to be performed, the error handling system 106 may further determine a mode or type of recalibration method required (e.g., one-point calibration, two-point calibration, multi point curve fitting). For example, the error handling system 106 may further determine a type of recalibration method required based on the sensor data (e.g., type of sensor error, such as offset, sensitivity or slope, linearity). For example, the error handling system 106 may be configured to determine a mode of recalibration to be performed on the sensor based on an amount of an error, a frequency of an error, or a history of the sensor. For example, the error handling system 106 may determine that a full recalibration is to be performed if an amount of error, frequency or error, or history (e.g., age) of the sensor, or any combination of the following, exceed(s) respective thresholds (e.g., an eighth threshold). The error handling system 106 may determine that only a partial recalibration is to be performed if an amount of error, frequency or error, or age of the sensor, or any combination of the following, do or does not exceed(s) respective thresholds (e.g., an eighth threshold). A partial recalibration may occur when the sensor is recalibrated by an amount less than that required to fully recalibrate the sensor. For example, if the sensor requires a ten degree correction to be fully calibrated, a partial recalibration may only recalibrate the sensor by five degrees. The error handling system 106 may further determine a mode of recalibration based on a load consumed by the error handling system 106, the sensor system 104, and/or the overall system.

In some embodiments, in response to the sensor being determined to be uncalibrated, the error handling system 106 further determines whether the sensor requires immediate recalibration or should be immediately recalibrated. For example, the sensor may require immediate recalibration or the error handling system 106 may determine that the sensor should be immediately recalibrated if no backup sensor and/or redundant sensor is available, or if conditions (e.g., traffic, environment) are especially dangerous. If the error handling system 106 determines that the sensor does not require immediate recalibration or should not be immediately recalibrated, the error handling system 106 may wait to recalibrate the sensor until a second sensor is determined to be uncalibrated so that the sensor and the second sensor may be recalibrated together. In some embodiments, if the sensor does not require immediate recalibration, the error handling system 106 may wait to recalibrate the sensor when a required load on the error handling system 106, the sensor system 104, or the overall system would be lower than a current required load. For example, the error handling system 106 may decide to wait until a location or landmark with a higher past rate of success is available.

In some embodiments, after the sensor system 104 determines a probability of the sensor being uncalibrated, the error handling system 106 further selects an error handling method based on the probability of the sensor being uncalibrated. For example, if the probability of the sensor being uncalibrated is below a threshold (e.g. a ninth threshold), the error handling system 106 may conduct eliminating erroneous data or issuing an alert to a user, or both of the above, without recalibrating the sensor or initiating a backup sensor. If the probability of the sensor being uncalibrated is above a threshold (e.g. a tenth threshold), the error handling system 106 may conduct recalibrating the sensor or initiating a backup sensor.

In some embodiments, the error handling system 106 may be configured to initiate shut down of the vehicle, such as an AV, if recalibration attempts are unsuccessful (e.g., the sensor is not validated after recalibration). In some embodiments, the error handling system 106 may be configured to retry recalibration or attempt a different method of error handling. In some embodiments, the error handling system 106 may be configured to determine whether to perform a second recalibration based on an amount or degree of sensor error before the recalibrating (e.g. determined or measured by the sensor system 104), an amount or degree of sensor error after the recalibrating (e.g. determined or measured by the sensor system 104), or a difference between the amount or degree of sensor error before the recalibrating and the amount or degree of sensor error after the recalibrating. For example, an amount or degree of sensor error may be measured by an angular offset, a hinge angle offset, bias error, scale factor, error, non-linearity, noise, misalignment, offset, or laser offset, or any combination thereof. For example, if the amount or degree of sensor error after the recalibrating decreased compared to the amount or degree of sensor error before the recalibrating, the recalibrating may have been successful even if it did not completely calibrate the sensor. Thus, the error handling system 106 may determine to try a second recalibration. In some embodiments, the error handling system 106 may be configured to determine whether to perform a second recalibration based on a probability that the sensor is uncalibrated before or after the recalibration, or a difference between the probability that the sensor is uncalibrated after recalibration compared to before recalibration. In other embodiments, the error handling system 106 may determine whether to retry recalibration based on a load consumption, an amount of availability of a system load, a history of the sensor, an availability of a backup sensor, a density of moving objects detected at a current location, a weather condition at the current location, or an environment condition at the current location.

In some embodiments, the error handling system 106 is implemented as one or more programmable boards (e.g., programmable circuit boards) that are disposed logically and/or physically between the sensor system 104 and the sensor data processing system 108. For example, there may be one or more separate programmable boards for each type of sensor (e.g., a programmable board to filter camera sensor data, a programmable board to filter laser scanning system sensor data, a programmable board to filter ultrasonic sensor data, and/or the like), or there may be a single programmable board for all sensors.

The sensor data processing system 108 may function to process sensor data to sense an environment surrounding a vehicle and/or cause a vehicle to perform one or more vehicle driving actions such as autonomous driving actions (or, simply, "driving actions"). For example, the sensor data processing system 108 may process data captured at different times or from different sensor modalities to make the data compatible or suitable for comparison. In some embodiments, the sensor data processing system 108 may analyze sensor data to identify objects (e.g., traffic signals, road signs, other vehicles, pedestrians, and obstacles) in one or more regions surrounding the vehicle. The sensor data processing system 108 may process the historical data and/or the sensor data to separate any boundaries (such as between natural objects, for example, grass and road, sky and mountain, sky and ground). As used herein, driving actions may include controlling braking, acceleration, and/or steering without real time human input. Furthermore, as used herein, "real time human input" is intended to represent a human input that is needed to concurrently control wheel movement of a non-self-driving vehicle, such as gear shifting, steering control, braking pedal control, acceleration pedal control, crutch pedal control, and so on. The sensor data processing system 108 may be implemented as a central computing system of an autonomous vehicle.

In some embodiments, the sensor data processing system 108 may include filtering functionality. In various embodiments, the sensor data processing system 108 may not include filtering functionality. This may allow, for example, the sensor data processing system 108 to be implemented using less powerful components (e.g., slower processors, less memory, and/or the like), and still achieve all of the functionality of a vehicle such as an AV. In various embodiments, the filtering functionality is provided separately (not shown).

The communications network 110 may represent one or more computer networks (e.g., LAN, WAN, bus, or the like) or other transmission mediums. The communication network 110 may provide communication between the vehicle 102, systems 104-108 and/or other systems/engines described herein. In some embodiments, the communication network 110 includes one or more computing devices, routers, cables, buses, and/or other network topologies (e.g., mesh, and the like). In some embodiments, the communication network 110 may be wired and/or wireless. In various embodiments, the communication network 110 may include the Internet, one or more wide area networks (WANs) or local area networks (LANs), one or more networks that may be public, private, IP-based, non-IP based, and so forth.

Figure 2:
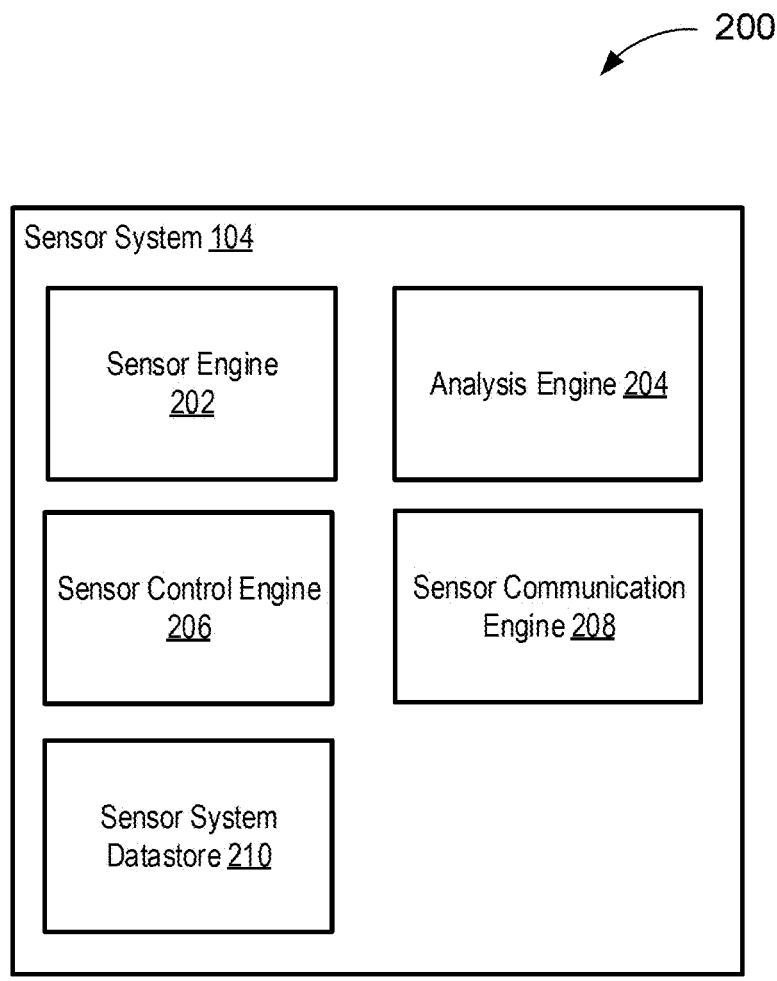
FIG. 2 depicts a diagram of an example of a sensor system according to some embodiments.

FIG. 2 depicts a diagram 200 of an example of a sensor system 104 according to some embodiments. In the example of FIG. 2, the sensor system 104 includes a sensor engine 202, an analysis engine 204, a control engine 206, a communication engine 208, and a sensor system datastore 210.

The sensor engine 202 may function to capture sensor data (e.g., first data) in one or more regions surrounding a vehicle. The sensor engine 202 may include one or more sensors. The sensors may include laser scanning systems (e.g., Lidar systems), radar systems, cameras, GPS, sonar, ultrasonic, IMU, and FIR (far infrared) sensors and/or the like.

In some embodiments, the sensors may include a rotatable laser scanning system. The rotatable laser scanning system may include a laser, scanner and optics, photodetector and receiver electronics, and position and navigation systems. The rotatable laser scanning system may project light (e.g., pulsed laser light) on regions surrounding a vehicle such as an autonomous vehicle (e.g., an autonomous vehicle the rotatable laser scanning system is mounted on) and measure the reflected pulses. The reflected pulses may be used to generate representations (e.g., 3D representations) of the regions surrounding the autonomous vehicle. The rotatable laser scanning system may rotate 360 degrees in order to capture sensor data for the regions surrounding the vehicle such as the autonomous vehicle.

In some embodiments, cameras may be mounted on the vehicle such as an AV to capture images (or, image data) of regions surrounding the vehicle. For example, the cameras may capture images in front of the vehicle, on the sides of the vehicle, above the vehicle, below the vehicle, and/or behind the vehicle.

The analysis engine 204 may be configured to determine whether a sensor of the one or more sensors is uncalibrated. The determining may be based on a result from a first validation of the first data from the sensor. The first validation may be based on a known parameter of the sensor or based on historical data.

In some embodiments, the first data may be processed and analyzed to be converted into, for example, an image histogram of a graphical representation of tonal distribution in an image captured by the sensor (e.g. by sensor data processing system 108). In some embodiments, the first data may be processed and analyzed to determine or estimate a parameter of the sensor. The parameter may include information of the sensor that may be compared with a known parameter from manufacturer specifications. The parameter may be indicative of Lidar point number distribution or camera pixel diversity and locality. The known parameter may have been obtained as a result of being processed or analyzed from historical data (e.g. by sensor data processing system 108). In some embodiments, the parameter may include an optical center, a focal length, a skew, a distortion, an image center, a depth of field, an angle of view, a beam angle, an aspect ratio, and a pixel number, a level of noise, and the like. In some embodiments, the first data may include an image captured from the sensor, or one or more specific features (such as trees, road grass, landmark, person, inanimate object) extracted from the image.

Historical data may refer to, as an example, an image, or one or more specific features of the image. The image (e.g., of the historical data) may be captured at a specific location, for example, taken at a same location as the first data. Historical data may be information already verified to be accurate. Historical data may be images from other sensors and/or onboard 3D map data.

In some embodiments, the analysis engine 204 conducts the first validation based on the known parameter. For example, the analysis engine 204 may be configured to determine or estimate a parameter from the first data (e.g., via processing of the first data) and compare the determined or estimated parameter to a known parameter. For example, the analysis engine 204 may be configured to process the first data into an image histogram of a graphical representation of tonal distribution in an image captured by the sensor.

In some embodiments, the analysis engine 204 determines a difference between the determined or estimated parameter and the known parameter. If the difference between the determined or estimated parameter and the known parameter exceeds a first threshold, the analysis engine 204 determines that the sensor from which the first data originated is uncalibrated. In some embodiments, if the difference between the determined or estimated parameter and the known parameter is below a second threshold, the analysis engine 204 determines that the sensor is calibrated. In some embodiments, if the difference between the determined or estimated parameter and the known parameter exceeds a first threshold but is less than a second threshold, the analysis engine 204 determines that further validation is desired, to determine whether the sensor is uncalibrated.

The analysis engine 204 may validate the sensor based on historical data. As an example, how closely the first data matches with the historical data may be a basis for determining whether the sensor is uncalibrated. As an example, how closely the first data matches with the historical data may be based on a proportion of features present in the historical data that are also in common with one or more features extracted from the first data, or, of the features that are in common between the historical data and the first data, how closely each of the features matches (e.g. a degree of similarity between each of the features).

In some embodiments, the analysis engine 204 may be configured to determine a proportion of the one or more features of the historical data that matches the one or more features of the first data, and determine whether the proportion is less than a third threshold. For example, the analysis engine 204 may determine whether one or more common feature(s) (such as a tree, monument, road, grass, landmark, person, inanimate object) is present in both the first data and the historical data. If the proportion is less than a third threshold, the analysis engine 204 may determine that further validation is desired before determining whether the sensor is uncalibrated. In other embodiments, the analysis engine 204 may determine that the sensor is uncalibrated if the proportion is less than a third threshold. In other embodiments, in addition or in place of determining whether the proportion is less than the third threshold, the analysis engine 204 may test on the basis of individual features of the historical data. For example, of the features of the historical data that matches the one or more features of the first data, the analysis engine 204 may select one, some, or all of the aforementioned matching features, and determine how closely each of the selected feature(s) matches between the historical data and the first data (e.g. a degree of similarity between each of the features). If each of the selected feature(s) matches sufficiently between the historical data and the first data, the analysis engine 204 may determine that the sensor does not require recalibration, or is calibrated. If some or all of the selected features(s) does not sufficiently match between the historical data and the first data, the analysis engine 204 may determine that further validation is desired, or that the sensor is uncalibrated. For example, if one, some, or all of the features of the historical data exhibits a similarity with the first data of greater than a third threshold, the analysis engine 204 may determine that the sensor is calibrated. In some embodiments, if the similarity is less than a fourth threshold, the analysis engine 204 may determine that the sensor is uncalibrated, or that further testing may be desired to determine whether the sensor is uncalibrated. In some embodiments, if the similarity is between a third and fourth threshold, the analysis engine 204 may determine that further testing may be desired.

For example, if historical data includes a feature (e.g., a building) that is not present in the first data, the discrepancy may be a result of the sensor being uncalibrated, or the sensor may be calibrated but the building is no longer present. In such scenario, the analysis engine 204 may determine that further testing may be desired to determine whether the sensor is calibrated. For example, the analysis engine 204 may determine that further testing may be done on the basis of second data taken at a different time and/or by a different sensor.

In some embodiments, the analysis engine 204 may obtain information resulting from further processing of the historical data and/or the first data to determine whether any boundaries are present (such as between natural objects, for example, grass and road, sky and mountain). In some embodiments, the analysis engine 204 may analyze one or more of the boundaries between the historical data and the first data for similarities and differences. In some embodiments, if one, some, or all of the boundaries between the historical data and the first data have a similarity exceeding a third threshold, the analysis engine 204 determines that the sensor is calibrated. In some embodiments, if one, some, or all of the boundaries between the historical data and the first data have a similarity lower than a fourth threshold, the analysis engine 204 determines that the sensor is uncalibrated, or that further validation is desired to determine whether the sensor is calibrated.

In some embodiments, the analysis engine 204 may compare relative sizes of the one or more features of the historical data with relative sizes of the one or more features of the first data. In some embodiments, the analysis engine 204 may compare a relative spacing between the one or more features of the historical data with a relative spacing between the one or more features of the first data. If there is a discrepancy between the historical data and the first data, the analysis engine 204 may determine the sensor is uncalibrated or that further validation of the sensor is desired.

In some embodiments, the analysis engine 204 may compare an orientation of the first data with an orientation of the historical data. For example, if the first data is upside down or rotated relative to the historical data, the analysis engine 204 may determine the sensor is uncalibrated or that further validation of the sensor is desired.

In some embodiments, the analysis engine 204 may alternatively, or in addition to conducting the first validation on the basis of the known parameter or the historical data, validate the sensor based on a continuous or sequential series of images or frames obtained by the sensor. The sensor may be a camera or Lidar, for example. The sensor may also be radar, GPS, sonar, ultrasonic, IMU, and FIR (far infrared) and/or the like.

For example, the analysis engine 204 may determine whether a feature on the series of images is determined to be continuously increasing in size in a smooth manner as the vehicle moves towards the feature, or is determined to be continuously decreasing in size in a smooth manner as the vehicle moves away from the feature. If the feature is not determined to be changing in size appropriately as the vehicle is moving, the analysis engine 204 may determine that the sensor is uncalibrated or that further validation of the sensor is desired. For example, if a feature disappears or appears abruptly, the analysis engine 204 may determine that the sensor is uncalibrated or that further validation of the sensor is desired. Thus, the analysis engine 204 may measure a rate at which the feature disappears or appears and compare the rate to a reference value, in order to determine whether the sensor is uncalibrated or whether further validation of the sensor is desired.

In some embodiments, the analysis engine 204 may adjust the known parameter by a compensation factor based on a time of day, an amount of ambient light, or an environment condition. For example, the analysis engine 204 may adjust the known parameter to account for the fact that the vehicle is operating at nighttime, while the known parameter may have been taken during the daytime. In some embodiments, the analysis engine 204 may refer to a lookup table of the known parameter or a lookup table of the historical data. The lookup table may be stored in memory (e.g., sensor system datastore 210). The lookup table may comprise values of the known parameter or images of the historical data based on different times of day, different amounts of ambient light, or an environment condition (e.g., levels of fog, levels of smog, humidity, precipitation, snow). The lookup table may comprise values of the known parameter or images of the historical data based on a combination of time of day, amount of ambient light, or other environment conditions. For example, the lookup table may comprise images of the historical data taken at each hour of the day. As another example, the lookup table may comprise values of the known parameter based on a level of ambient light at a location (e.g., tunnel, direct sunlight). In some embodiments, the analysis engine 204 may select a corresponding entry from the lookup table that is closest to the first data. The analysis engine 204 may use the selected entry as a basis to determine whether the sensor is uncalibrated. For example, if the entry is a parameter, the analysis engine 204 may compare the entry to the determined or estimated parameter from the first data. If the entry is historical data (e.g., image), the analysis engine 204 may analyze the entry and the first data to determine whether the sensor is uncalibrated.

In some embodiments, the analysis engine 204 may determine further validation is desired, and for the further validation, select either the first validation or a second validation, the selection being based on a comparison of a computation load requirement of the first validation and a computation load requirement of the second validation. For example, the second validation may be based on a second data captured at a different time or from a second sensor. For example, the analysis engine 204 may select either the first validation or the second validation, whichever validation requires a minimum computation load. In some embodiments, the analysis engine 204 may conduct the first validation based on the known parameter. The analysis engine 204 may then determine that further validation is desired, and select from the first validation and the second validation. The analysis engine 204 may determine whether the historical data is stored in a memory (e.g., sensor system datastore 210). If the analysis engine 204 determines that the historical data of the first data is stored in the memory, the analysis engine 204 may select the first validation over the second validation. In some embodiments, if the analysis engine 204 determines that the historical data of the first data is not stored in the memory, the analysis engine 204 may select the second validation over the first validation. In some embodiments, if the analysis engine 204 determines that the historical data of the first data is not stored in the memory, the analysis engine 204 may upload map data (e.g., 3D map data) onto the analysis engine 204, to use as a basis for the further validation. The map data may be at a same location as the first data. In some embodiments, the analysis engine 204 may determine whether uploading and comparing the map data requires or consumes more computation load compared to using the second validation. If the uploading and comparing the map data requires or consumes more computation load than other validation methods, then the analysis engine 204 may not upload the map data. If the uploading and comparing the map data does not require or consume more computation load than the other validation methods, then the analysis engine 204 may upload the map data, and use the map data in place of the historical data as a basis for the further validation.

In some embodiments, if the analysis engine 204 determines that further validation is desired, the analysis engine 204 may determine whether error handling requires or consumes less resource load compared to the total resource load (e.g., computation load) required or consumed by the further validation. If error handling is determined to require or consume less resource load (e.g., from an error handling system such as error handling system 106), the analysis engine 204 may inform the error handling module (e.g., 106) to perform error handling, via the communication network 110, instead of conducting the further validation (first validation or second validation). In other words, the analysis engine 204 may select the most energy efficient option, whether it be selecting between the first validation or the second validation or selecting between a validation and error handling.

In some embodiments, the analysis engine 204 may be configured to determine whether the sensor is uncalibrated based on only the first validation or based on the first validation and further validations, such as the first validation or the second validation. For example, the determining may be based on the known parameter, then further validation based on the historical data, and additional further validation based on the second validation. In some embodiments, the analysis engine 204 may conduct any series of the first validation and the second validation in parallel or sequentially. The analysis engine 204 may conduct the first validation and the second validation in any combination and in any sequential order. For example, the analysis engine 204 may conduct the first validation, then conduct the second validation, and lastly conduct the first validation. As another example, the analysis engine 204 may conduct the first validation and the second validation simultaneously, then conduct the first validation alone. In some embodiments, the analysis engine 204 may conduct the first validation or the second validation only if it is determined to be desired.

In some embodiments, if the analysis engine 204 conducts a second validation, the first data and the second data may be captured from different sensors at a same time, a same sensor at different, sequential times, or different sensors at different, sequential times. If the first data and the second data are captured at different times, one of the first data and the second data may be processed, for example, by the sensor data processing system 108 to make the first data and the second data suitable for comparison, or to make it possible to determine differences or similarities between the first data and the second data, or between portions or features of the first data and the second data. For example, the second data may be reoriented to match the first data if it is taken by a different sensor and/or at a different time, for example, by the sensor data processing system 108. In some embodiments, the different sensors may be sensors of a same or a different modality. If the different sensors are of different modality, for example, Lidar and camera, or GPS and camera, the first data or the second data may be processed by the sensor data processing system 108 so that data from different modalities can be appropriately compared. In some embodiments, the second data is captured during the determining process, and not already stored as historical data or as a known parameter. For example, the second data may be captured subsequent to the generation of the first data. As another example, the second data may be captured immediately prior to the generation of the first data. In some embodiments, if the sensor is determined not to require recalibration, the first data captured from the sensor at the time of the determination is stored as historical data, for example, in memory such as the sensor system datastore 210. In some embodiments, if the sensor is determined to be calibrated, the first data (e.g., image or feature of the image) captured from the sensor is stored in a lookup table (e.g., in the sensor system datastore 210).

The analysis engine 204 may be further configured to adjust a frequency of the first validation or the second validation based on a computation load requirement or consumption of the first validation or the second validation, an amount of availability of a computation load of the sensor system 104 or the analysis engine 204, a history of the sensor, a density of moving objects detected, a weather condition, or an environment condition. For example, if a computation load requirement or consumption of the first validation or the second validation is high, the analysis engine 204 may conduct the first validation or the second validation less frequently. As another example, if there are not enough resources available on the sensor system 104 or the analysis engine 204 to be able to conduct the first or the second validation, the analysis engine 204 may adjust the frequency of the first validation or the second validation so that they are conducted less frequently. As another example, if the sensor is old or frequently requires recalibration, the analysis engine 204 may conduct the first validation or the second validation more frequently. As another example, if the density of moving objects (e.g., people, vehicles) detected is high, which signifies a higher danger, the analysis engine 204 may conduct the first validation or the second validation more frequently. As another example, if the weather conditions are rainy or snowy, signifying a higher danger, the analysis engine 204 may conduct the first validation or the second validation more frequently. As another example, if the environment conditions are foggy, hazy, or polluted, signifying a higher danger, the analysis engine 204 may conduct the first validation or the second validation more frequently.

The analysis engine 204 may be configured to adjust the frequency of the first validation or the second validation based on at least one of, or any combination of, the computation load requirement of the first validation or the second validation, the amount of availability of a computation load of the sensor system 104 or analysis engine 204, the history of the sensor, the density of moving objects detected, a weather condition, and an environment condition. For example, the analysis engine 204 may be configured to adjust the frequency of the first validation and the frequency of the second validation based on the same factors, or based on different factors. For example, the analysis engine 204 may be configured to adjust the frequency of the first validation based on the history of the sensor and based on the computation load requirement of the first validation. For example, the analysis engine 204 may be configured to adjust the frequency of the first validation based on the history of the sensor and based on the computation load requirement of the first validation, while adjusting the frequency of the second validation based on the density of moving objects detected, the weather condition, or the environment condition.

In some embodiments, the analysis engine 204 may attempt to validate the sensor again (e.g., after recalibration efforts) using a same validation or sequence of validation as was done to determine whether the sensor is calibrated. In some embodiments, after recalibration efforts, the analysis engine 204 may attempt to validate the sensor again using a different validation or sequence of validation. For example, the analysis engine 204 may conduct validation based on the second validation, or based on the second data instead of conducting the first validation after recalibration efforts. In some embodiments, the analysis engine 204 may select a validation or validations after recalibration efforts based on which validation or validations consumes or requires a least system load on the sensor system 104. In some embodiments, after the analysis engine 204 conducts the validation after recalibration attempt by the error handling system 106, the analysis engine 204 saves a result of the recalibration of the sensor in a memory (e.g., sensor system datastore 210). The result may comprise whether the recalibration was successful or specific data of the recalibration, such as data before the recalibration and data after the recalibration. The result may further comprise a location or a specific landmark used for the recalibration.

The control engine 206 may function to control the sensor engine 202 or the analysis engine 204. More specifically, the control engine 206 may function to control the one or more sensors of the sensor engine 202, and/or components of the sensor engine 202 or the analysis engine 204. In some embodiments, the control engine 206 may control a rotatable laser scanner system to selectively capture sensor data. Similarly, the control engine 206 may function to not capture certain sensor data. For example, the cameras may be powered off, controlled to not capture images, controlled to delete and/or not store captured images, and/or the like.

The communication engine 208 may function to send requests, transmit and, receive communications, and/or otherwise provide communication with one or a plurality of systems. In some embodiments, the communication engine 208 functions to encrypt and decrypt communications. The communication engine 208 may function to send requests to and receive data from one or more systems through a network or a portion of a network. Depending upon implementation-specified considerations, the sensor communication engine 208 may send requests and receive data through a connection, all or a portion of which may be a wireless connection. The sensor communication engine 208 may request and receive messages, and/or other communications from associated systems.

Communications may be stored at least temporarily (e.g., cached and/or persistently) in the sensor system datastore 210. For example, the lookup table may be stored in the sensor system datastore 210. As another example, the historical data, historical data, the known parameters, and/or thresholds (e.g., first threshold, second threshold, third threshold, fourth threshold) may be stored in the sensor system datastore 210. In some embodiments, the sensor system datastore 210 is a memory. As another example, a result of previous recalibrations or error handling of the sensor may be stored sensor system datastore 210). For example, the result of previous recalibrations may comprise whether the recalibration was successful or specific data of the recalibration, such as data before the recalibration and data after the recalibration. The result of previous recalibrations may further comprise a location or a specific landmark used for the recalibration. The sensor system datastore 210 may comprise results of previous recalibrations organized by time, sensor, type of sensor modality, location, or type of recalibration method (e.g., one-point calibration, two-point calibration, multi point curve fitting), or one or more of the aforementioned.

Figure 3:
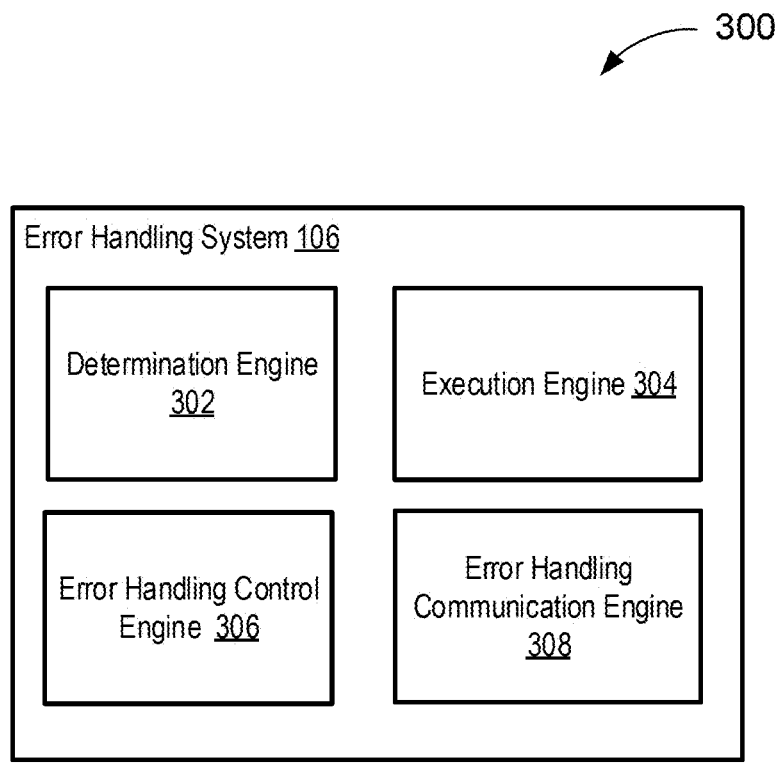
FIG. 3 depicts a diagram of an example of an error handling system according to some embodiments.

FIG. 3 depicts a diagram 300 of an example of an error handling system 106 according to some embodiments. In the example of FIG. 3, the error handling system 106 includes a determination engine 302, an execution engine 304, an error handling control engine 306, and an error handling communication engine 308.

The determination engine 302 may function to determine which error handling method or sequence of methods to perform. The determination engine 302 may select an error handling method or combination of methods that consumes a minimum system load on the error handling system 106, the sensor system 104, or the overall system. In some embodiments, the determination engine 302 may select an error handling method or methods based on a load consumption of the method or methods, an amount of availability of a system load, a history of the sensor, an availability of a backup sensor, a density of moving objects detected at a current location, a weather condition at the current location, or an environment condition at the current location. In some embodiments, the determination engine 302 may select an error handling method based on the one or more results of previous error handling methods of the sensor, for example, stored in memory. The one or more results of previous error handling methods of the sensor may comprise a lookup table. The determination engine 302 may select an error handling method based on a method that has a highest rate of success for that particular sensor or a sensor of that modality. As another example, the determination engine 302 may select an error handling method based on a method that has a highest increasing rate of success or a lowest decreasing rate of success for that particular sensor or a sensor of that modality. For example, the determination engine 302 may select an error handling method that has a best trend of success rate, such as, for example, the method that has a rate of success that has decreased less than other methods, or a rate of success that has increased more than other methods. In some embodiments, the determination engine 302 may select the error handling method or methods based on any combination of the aforementioned factors. In some embodiments, if previous rate of success of recalibration is greater than a threshold (e.g. a fifth threshold), the determination engine 302 chooses recalibration as the error handling method. In some embodiments, if previous rate of success of recalibration is lower than a threshold (e.g. a fifth threshold), the determination engine 302 does not choose recalibration as the error handling method but instead chooses initiating a backup sensor as the error handling method. In some embodiments, a previous rate of success of recalibration is measured at a specific location, landmark, or type of landmark (e.g., traffic sign, light). For example, if a previous rate of success of recalibration specifically at a traffic light is lower than a threshold (e.g. a fifth threshold), the error handling system 106 does not choose recalibration as the error handling method.

In some embodiments, the determination engine 302 determines that a backup sensor is to be initiated if a backup sensor is available and if the sensor is uncalibrated. In some embodiments, the determination engine 302 determines that, if the backup sensor is available, the sensor is not to be recalibrated, or the recalibration of the sensor is to be delayed.

In some embodiments, in response to the sensor being determined to be uncalibrated, the determination engine 302 further determines whether the sensor requires immediate recalibration. For example, the sensor may require immediate recalibration if no backup sensor and/or redundant sensor is available. If the determination engine 302 determines that the sensor does not require immediate recalibration, the determination engine 302 may send a message to execution engine 304 to wait to recalibrate the sensor until a second sensor is determined to be uncalibrated so that the sensor and the second sensor may be calibrated together. In some embodiments, if the sensor does not require immediate recalibration, the determination engine 302 may wait to recalibrate the sensor when a required load on the error handling system 106, the sensor system 104, or the overall system would be lower than a current required load. For example, the determination engine 302 may send a message to execution engine 304 to wait until a location or landmark with a higher past rate of success of recalibration is available.

In some embodiments, after the sensor system 104 determines a probability of the sensor being uncalibrated, the determination engine 302 further selects an error handling method based on the probability of the sensor being uncalibrated. For example, if the probability of the sensor being uncalibrated is below a threshold (e.g. a sixth threshold), the determination engine 302 may determine that the error handling method is to conduct eliminating erroneous data or issuing an alert to a user, or both of the above, without recalibrating the sensor or initiating a backup sensor. If the probability of the sensor being uncalibrated is above a threshold (e.g. a sixth threshold), the determination engine 302 may conduct recalibrating the sensor or initiating a backup sensor.

In some embodiments, the determination engine 302 may be configured to determine whether to initiate shut down of the vehicle, such as an AV, if recalibration attempts are unsuccessful (e.g., the sensor is not validated after recalibration). In some embodiments, the determination engine 302 may be configured to determine whether to retry recalibration or attempt a different error handling method. In some embodiments, the determination engine 302 may be configured to determine whether to perform a second recalibration based on an amount or degree of sensor error before the recalibrating (e.g. determined or measured by the sensor system 104), an amount or degree of sensor error after the recalibrating (e.g. determined or measured by the sensor system 104), or a difference between the amount or degree of sensor error before the recalibrating and the amount or degree of sensor error after the recalibrating. For example, if the amount or degree of sensor error after the recalibrating decreased compared to the amount or degree of sensor error before the recalibrating, the recalibrating may have been successful even if it did not completely calibrate the sensor. Thus, the determination engine 302 may determine to try a second recalibration. In some embodiments, the determination engine 302 may be configured to determine whether to perform a second recalibration based on a probability that the sensor is uncalibrated before or after the recalibration, or a difference between the probability that the sensor is uncalibrated after recalibration compared to before recalibration. In other embodiments, the determination engine 302 may determine whether to retry recalibration based on a load consumption, an amount of availability of a system load, a history of the sensor, an availability of a backup sensor, a density of moving objects detected at a current location, a weather condition at the current location, or an environment condition at the current location.

The execution engine 304 may be configured to perform the specific error handling methods as determined by the determination engine 302. In some embodiments, the execution engine 304 may be configured to eliminate data determined to be erroneous. In some embodiments, the execution engine 304 may be configured to eliminate only data determined to be erroneous while retaining the correct data. For example, if only a portion of an image is determined to be erroneous, the execution engine 304 may eliminate only the portion determined to be erroneous while retaining the remainder of the image. In some embodiments, the execution engine 304 may be configured to initiate a backup sensor to operate, for example, until the uncalibrated sensor is successfully recalibrated. In some embodiments, the execution engine 304 may be configured to initiate a backup sensor if a backup sensor is available, rather than recalibrating the sensor. In some embodiments, the execution engine 304 may be configured to initiate a backup sensor if a backup sensor is available and if the backup sensor is calibrated. In some embodiments, the execution engine 304 may be configured to recalibrate the sensor. For example, the execution engine 304 may be configured to recalibrate the sensor based on a landmark. In some embodiments, the execution engine 304 may be configured to issue an alert of an uncalibrated sensor or potentially uncalibrated sensor. In some embodiments, the execution engine 304 may be configured to shut down the vehicle such as an AV.

The error handling control engine 306 may function to control the determination engine 302 or the execution engine 304. More specifically, the error handling control engine 306 may function to control one or more components of the determination engine 302 or the execution engine 304.

The communication engine 308 may function to send requests, transmit and, receive communications, and/or otherwise provide communication with one or a plurality of systems. In some embodiments, the communication engine 308 functions to encrypt and decrypt communications. The communication engine 308 may function to send requests to and receive data from one or more systems through a network or a portion of a network. Depending upon implementation-specified considerations, the sensor communication engine 308 may send requests and receive data through a connection, all or a portion of which may be a wireless connection. The sensor communication engine 308 may request and receive messages, and/or other communications from associated systems.

Figure 4:
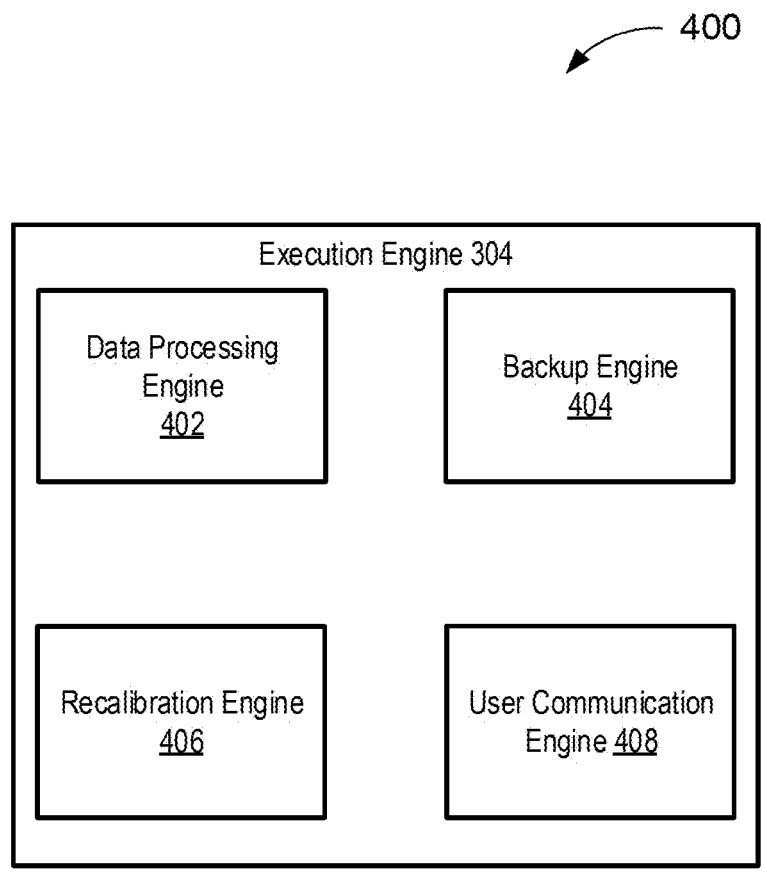
FIG. 4 depicts an example of a memory according to some embodiments.

FIG. 4 depicts a diagram 400 of an example of an execution engine 304 according to some embodiments. In the example of FIG. 4, the execution engine 304 includes a data processing engine 402, a backup engine 404, a recalibration engine 406, and user communication engine 408.

The data processing engine 402 may be configured to eliminate data determined to be erroneous, for example, coming from an uncalibrated sensor. In some embodiments, the data processing engine 402 may be configured to eliminate only data determined to be erroneous while retaining the correct data. For example, if only a portion of an image is determined to be erroneous, the data processing engine 402 may eliminate only the portion determined to be erroneous while retaining the remainder of the image. In some embodiments, the data processing engine 402 may be configured to eliminate all data from an uncalibrated sensor, for example, from a memory. In some embodiments, the data processing engine 402 determines whether to remove data from an uncalibrated sensor based on a likelihood or probability of the data being erroneous. In some embodiments, the data processing engine 402 may be configured to adjust data determined to be erroneous. For example, if a dirty lens detector detects a dirty lens, the data processing engine may be configured to adjust data affected by the dirty lens.

The backup engine 404 may be configured to initiate a backup sensor to operate, for example, until the sensor requiring recalibration is successfully recalibrated. In some embodiments, the backup engine 404 may be configured to initiate a backup sensor if a backup sensor is available. In some embodiments, the backup engine 404 may be configured to initiate a backup sensor if a backup sensor is available and if the backup sensor is calibrated. In some embodiments, the backup engine 404 may be configured to initiate a backup sensor based on a load consumption of the method or methods, an amount of availability of a system load, a history of the sensor, an availability of a backup sensor, a density of moving objects detected at a current location, a weather condition at the current location, or an environment condition at the current location. In some embodiments, the backup engine 404 may be configured to initiate a backup sensor if recalibrating the sensor is unsuccessful or impractical. For example, recalibrating the sensor may be impractical if it consumes or requires too much system resources, or if a previous rate of success of recalibration is lower than a threshold (e.g., fifth threshold).

The recalibration engine 406 may be configured to perform a recalibration or to perform a second recalibration, according to a determination by a determination engine (e.g., determination engine 302) or error handling system (e.g., error handling system 106). For example, the recalibration engine 406 may perform a recalibration or a second recalibration based on a landmark (e.g., traffic light, sign, known road feature). For example, the recalibration engine 406 may select, among landmarks located along a route to be travelled and stored in the memory (e.g., memory 500), a landmark to be used for the recalibration based on one or more results of previous recalibrations. As another example, the recalibration engine 406 may select, among landmarks located along a route to be travelled and stored in the memory (e.g., memory 500), a landmark to be used for the recalibration or second recalibration based on one or more results of previous recalibrations, in response to the error handling system 106 determining that the recalibration or the second recalibration needs not be performed immediately. If the error handling system 106 determines that the recalibration or the second recalibration should be, or is required to be, performed immediately, the recalibration engine 406 may select a landmark closest to a current location, and/or the landmark that is fastest to get to along a route to be travelled.

For example, the recalibration engine 406 may select a landmark having a highest previous rate of success of recalibration with the sensor. As another example, the recalibration engine 406 may select a landmark having a highest previous rate of success of recalibrations with one or more sensors having a same modality as the sensor. For example, if the sensor is a Lidar sensor, the recalibration engine 406 may select a landmark for which the success rate of recalibrations in all Lidar sensors of the vehicle is highest. For example, if a landmark having a highest previous rate of success of recalibration with the sensor cannot be determined (e.g., no history of sensor) then the recalibration engine determines a landmark for which the success rate of recalibrations in all Lidar sensors of the vehicle is highest. As another example, the recalibration engine 406 may select a landmark for which the overall success rate of recalibrations in all sensors (of all modalities) of the vehicle is highest. As another example, the recalibration engine 406 may select a landmark that, when used for the recalibration, requires a minimum load for the recalibration compared to other landmarks. As another example, the recalibration engine 406 may select a landmark that is based on a most recent recalibration of the sensor, another sensor of a same modality of the sensor, or another sensor of any modality. The recalibration engine 406 may select a landmark if a most recent recalibration used that landmark and was successful. As another example, the recalibration engine 406 may select a landmark having a nearest location compared to other landmarks. As another example, the recalibration engine 406 may select a landmark having a nearest location, in response to the error handling system 106 determining that the sensor requires immediate recalibration. As another example, the recalibration engine 406 may select a landmark on the basis of any of the aforementioned factors, in response to the error handling system 106 determining that the sensor does not require immediate recalibration.

As another example, the recalibration engine 406 may perform the second recalibration using a landmark of a same type as the landmark used in the recalibration prior to the second recalibration. For example, if the recalibration utilized a traffic light, the recalibration engine 406 may use a same or different traffic light for the second recalibration. As another example, in response to the error handling system 106 determining that the second recalibration is not to be performed immediately, the recalibration engine 406 selects The recalibration engine 406 may be configured to access a memory (e.g., memory 500). The memory may include one or more results of previous recalibrations of the sensor, each of the one or more results indicating whether a previous recalibration was successful, a method of recalibration used in the previous recalibration, a time of the previous recalibration, an amount of ambient light at the time of the previous recalibration, a brightness of a landmark used in the previous recalibration, a location of the landmark, a load consumption of the recalibration, a modality of the sensor, or an age of the sensor. For example, the recalibration engine 406 may select a previously successful recalibration method (e.g. landmark) in which an amount of ambient light at the time of the previous recalibration was closest to the current amount of ambient light, or a brightness of a landmark used in the previous recalibration was closest to the current measured brightness of a nearest landmark.

The user communication engine 408 may be configured to alert a user that a sensor is uncalibrated or potentially uncalibrated, or provide the user a probability of the sensor being uncalibrated. The user communication engine 408 may further be configured to alert the user of a recommended error handling method or to allow the user to select from possible error handling methods. The user communication engine may further alert the user of an impending shutdown.

Alternatively, any of the data processing engine 402, backup engine 404, recalibration engine 406, or the user communication engine 408 may be integrated with one another, for example, in a single engine. For example, one or more of the following tasks in the group of tasks consisting of the data processing, initiating the backup sensor, recalibrating or alerting the user may be performed by a single engine.

FIG. 5 depicts a memory 500. The memory 500 may store one or more results of previous recalibrations of the sensor, each of the one or more results indicating whether a previous recalibration was successful, a method of recalibration used in the previous recalibration, a time of the previous recalibration, an amount of ambient light at the time of the previous recalibration, a brightness of a landmark used in the previous recalibration, a location of the landmark, a load consumption of the recalibration, a modality of the sensor, or an age of the sensor. The memory 500 may store any combination of the one or more results. The memory 500 may store overall results for all of the one or more previous recalibrations, and/or store a result of a specific previous recalibration.

Figure 6:
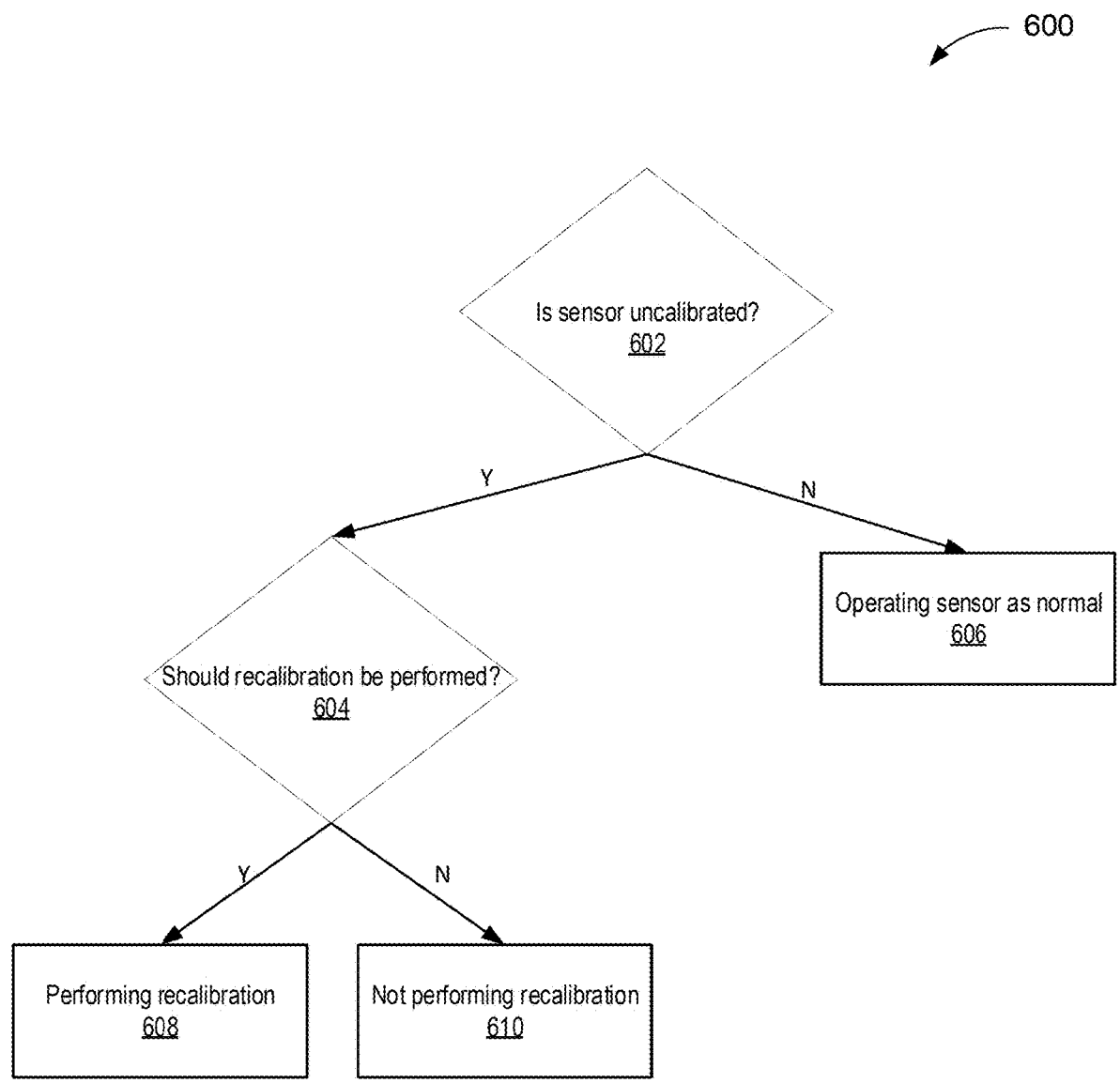
FIG. 6 depicts a flowchart of an example of a recalibration method according to some embodiments.

FIG. 6 depicts a flowchart 600 of an example of an error handling method of a sensor in a vehicle such as an AV. In this and other flowcharts, the flowchart 600 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 6.

In decision 602, a sensor system (e.g., sensor system 104) determines whether the sensor is uncalibrated. For example, the sensor system may determine whether the sensor is uncalibrated based on first data captured from a sensor or based on the first data and second data at a different time or a different sensor. As used herein, sensors may include laser scanning systems (e.g., Lidar systems), radar systems, cameras, GPS, sonar, ultrasonic, IMU, and FIR (far infrared) sensors and/or the like. The first data may be processed and analyzed to produce, for example, an image histogram of a graphical representation of tonal distribution in an image captured by the one or more sensors. The first data may be processed and analyzed to determine or estimate a parameter. Such parameters may include information generated from a statistical analysis of the data. Such parameters may include an optical center, a focal length, a skew, a distortion, an image center, a depth of field, an angle of view, a beam angle, an aspect ratio, and a pixel number, a level of noise, and the like. Such parameters may include information of the sensor that may be compared with known parameters from manufacturer specifications or parameters processed from historical data. Historical data may refer to, as an example, information obtained from an image or one or more specific features of the image at a specific location. Historical data may be information already verified by other images taken at a same location by other sensors and/or onboard 3D map data. The first data may include an image captured from the sensor, or one or more specific features (such as trees, road, grass, landmarks, people, inanimate objects) extracted from the image. If the sensor system determines the sensor is uncalibrated, in decision 604, an error handling system (e.g., error handling system 106) determines whether recalibration should be performed, or is required to be performed. In step 606, if the sensor system determines that the sensor is not uncalibrated, the sensor is operated as normal. In step 608, if the error handling system determines that recalibration should be performed, a recalibration engine (e.g., recalibration engine 406) attempts to perform recalibration. In step 610, if the error handling system determines that recalibration should not be performed, the recalibration engine does not perform recalibration.

Figure 7:
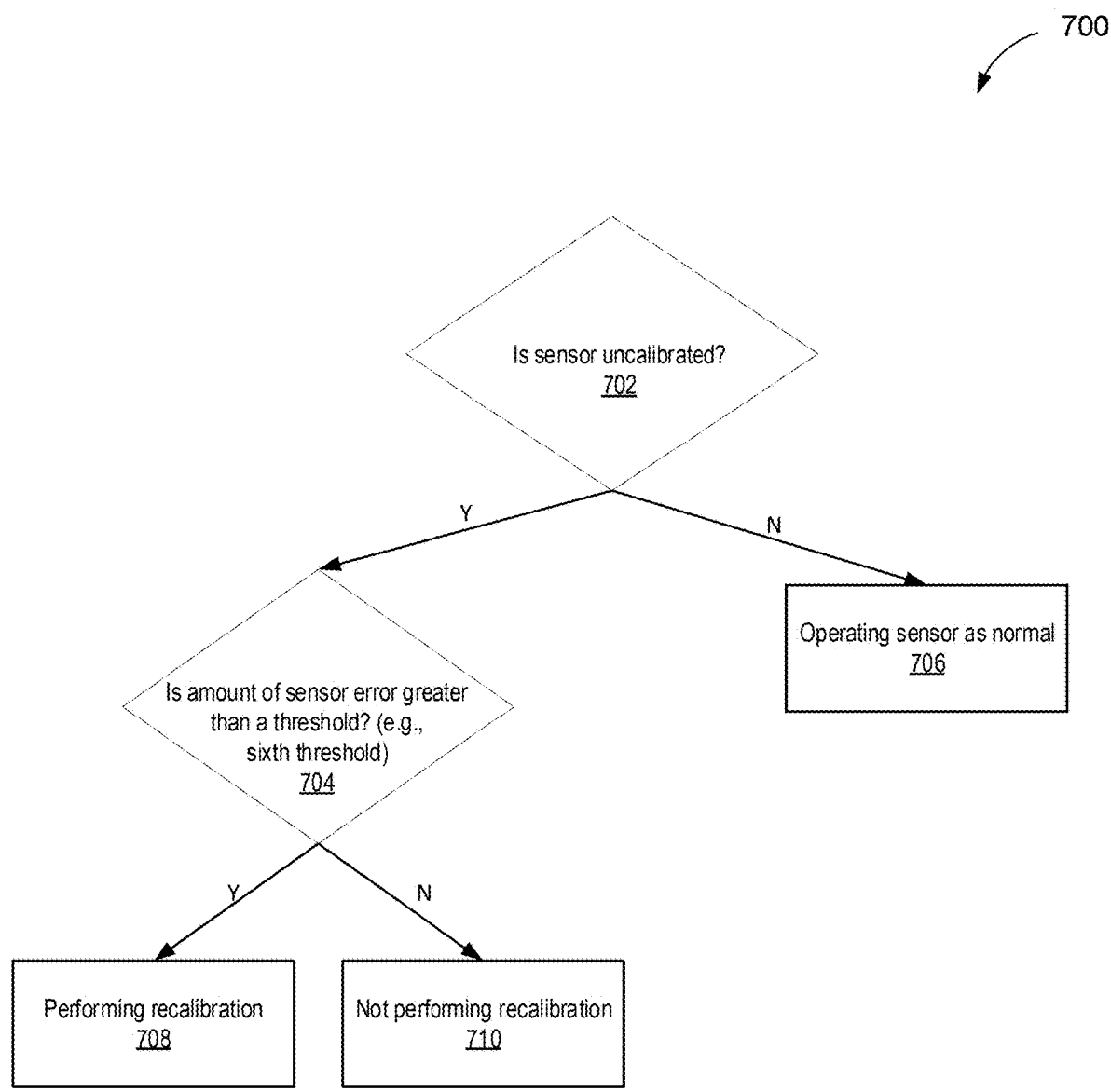
FIG. 7 depicts a flowchart of an example of a recalibration method according to some embodiments.

FIG. 7 depicts a flowchart 700 of an example of an error handling method of a sensor in a vehicle such as an AV.

In decision 702, a sensor system (e.g., sensor system 104) determines whether the sensor is uncalibrated, similar to decision 602 as described above in FIG. 6. In decision 704, an error handling system (e.g., error handling system 106) determines whether an amount of sensor error is greater than a threshold (e.g. sixth threshold). Alternatively, in decision 704, the error handling system may determine whether a frequency of an error is greater than a threshold (e.g. a seventh threshold). If the error handling system determines that the frequency is greater than the seventh threshold, the error handling system may determine that recalibration is to be performed on the sensor. In some embodiments, the error handling system may be configured to determine whether to perform the recalibration based on a combination of an amount of error and a frequency of an error occurrence, or one of an amount of error and a frequency of an error occurrence. An amount of an error may be determined by the sensor system and measured by, for example, an angular offset, a hinge angle offset, bias error, scale factor, error, non-linearity, noise, misalignment, offset, or laser offset, or any combination thereof, or the like. In step 706, if the sensor is not determined to be uncalibrated, the sensor is operated as normal. In step 708, if the amount of sensor error is determined to be greater than a sixth threshold, or the frequency of sensor error is determined to be greater than a seventh threshold, the recalibration engine (e.g., recalibration engine 406) attempts to perform recalibration on the sensor. In step 710, if the amount of sensor error is determined to not be greater than a sixth threshold, or the frequency of sensor error is determined to not be greater than a seventh threshold, the recalibration engine does not perform recalibration on the sensor.

Figure 8:
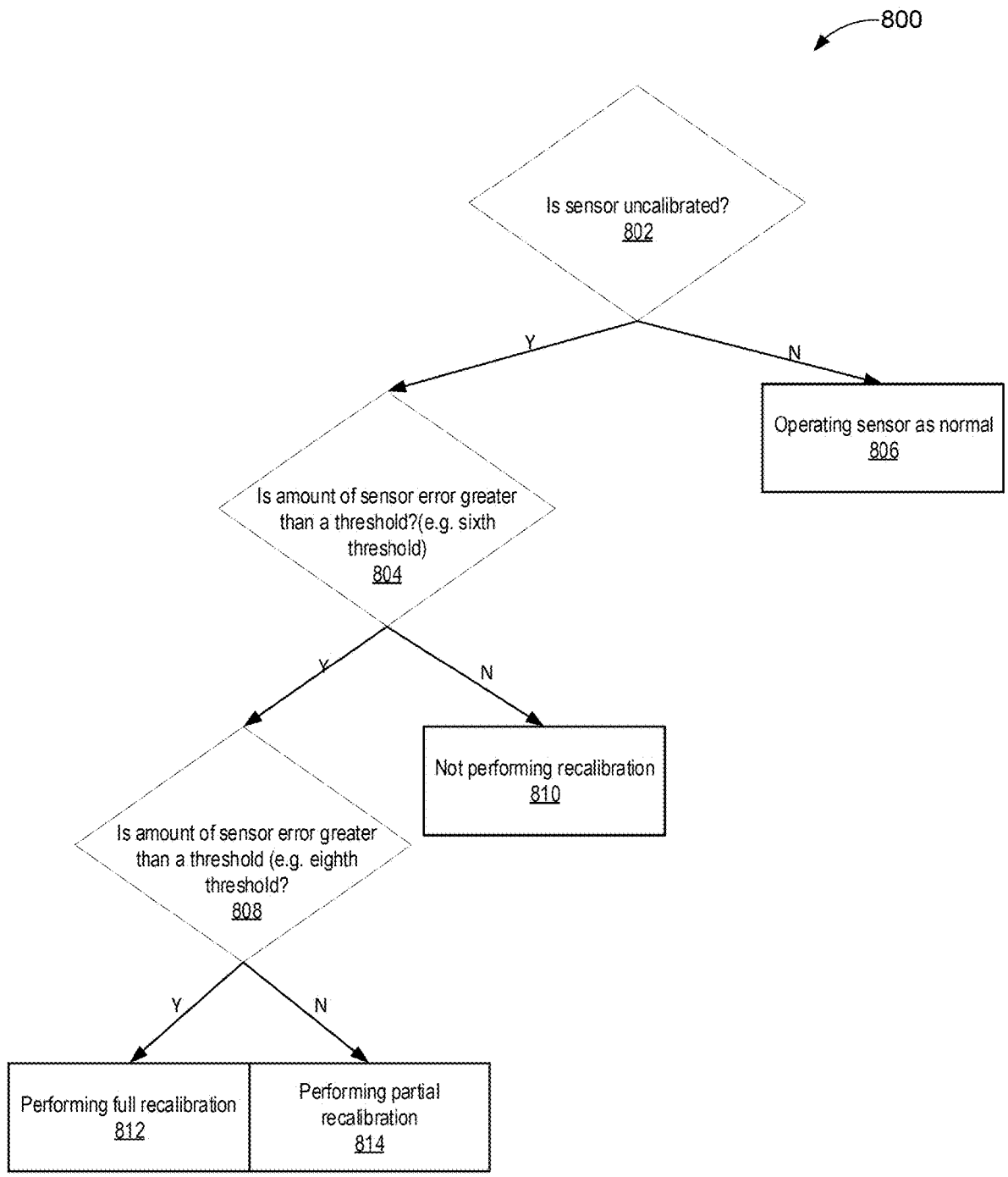
FIG. 8 depicts a flowchart of an example of a recalibration method according to some embodiments.

FIG. 8 depicts a flowchart 800 of an example of an error handling method of a sensor in a vehicle such as an AV.

In decision 802, a sensor system (e.g., sensor system 104) determines whether the sensor is uncalibrated, similar to decision 602 as described above in FIG. 6. In decision 804, an error handling system (e.g., error handling system 106) determines whether an amount of sensor error is greater than a threshold (e.g. sixth threshold), or whether a frequency of a sensor error is greater than a threshold (e.g., seventh threshold), similar to decision 704 as described in FIG. 7. In step 806, if the sensor is not determined to be uncalibrated, the sensor is operated as normal. In decision 808, the error handling system determines whether the amount of sensor error is greater than a threshold (e.g., eighth threshold, which is larger than a sixth threshold). Decision 808 may also be made on the basis of a frequency of a sensor error, or a history or age of the sensor. In step 810, if the amount of sensor error is determined not to be greater than a sixth threshold by the error handling system, the recalibration engine (e.g. recalibration engine 406) does not perform recalibration. In step 812, in response to decision 808, if the amount of sensor error is determined to be greater than an eighth threshold, the recalibration engine attempts to perform a full recalibration. In step 814, if the amount of sensor error is determined to not be greater than an eighth threshold (e.g. sensor error is between a sixth threshold and an eighth threshold), the recalibration engine attempts to perform a partial recalibration.

The recalibration engine may determine a mode or method of recalibration by accessing a memory (e.g. memory 500). The recalibration engine may determine a mode or method of recalibration based on one or more results of previous recalibrations of the sensor, each of the one or more results indicating whether a previous recalibration was successful, a method of recalibration used in the previous recalibration, a time of the previous recalibration, an amount of ambient light at the time of the previous recalibration, a brightness of a landmark used in the previous recalibration, a location of the landmark, a load consumption of the recalibration, a modality of the sensor, and/or an age of the sensor. For example, the recalibration engine may select a previously successful recalibration method (e.g. landmark) in which an amount of ambient light at the time of the previous recalibration was closest to the current amount of ambient light, or a brightness of a landmark used in the previous recalibration was closest to the current measured brightness of a nearest landmark.

Figure 9:
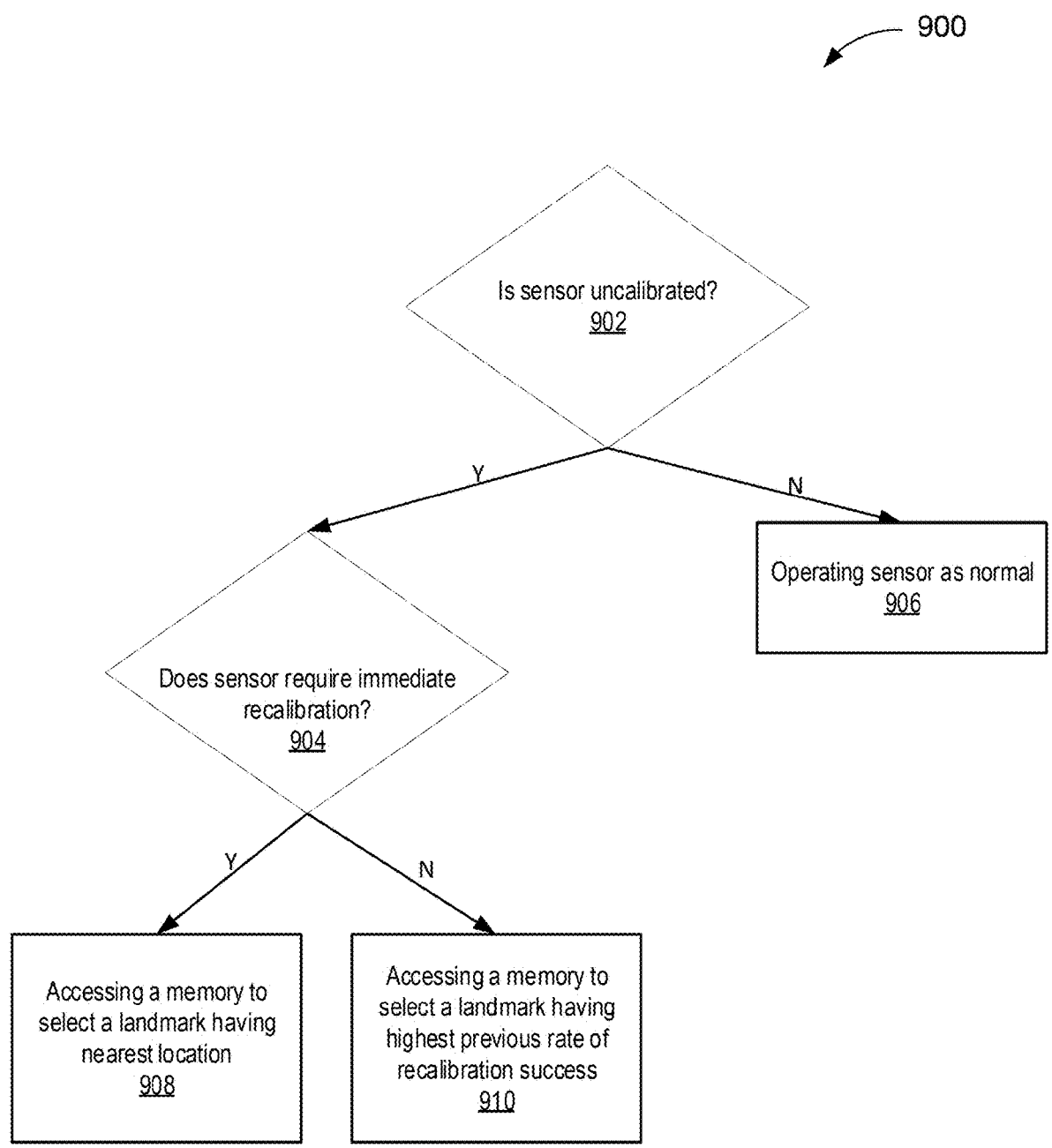
FIG. 9 depicts a flowchart of an example of a recalibration method according to some embodiments.

FIG. 9 depicts a flowchart 900 of an example of an error handling method of a sensor in a vehicle such as an AV. In decision 902, a sensor system (e.g., sensor system 104) determines whether the sensor is uncalibrated, similar to decision 602 as described above in FIG. 6. In decision 904, an error handling system (e.g., error handling system 106) determines whether the sensor requires immediate recalibration or should be immediately recalibrated. For example, the error handling system may determine that the sensor should be immediately recalibrated, or requires immediate recalibration, if no backup sensor and/or redundant sensor is available, or if conditions (e.g., traffic, environment) are especially dangerous. In step 906, if the sensor is determined not to be uncalibrated, the sensor is operated as normal by the system. In step 908, if the error handling system determines that the sensor requires immediate recalibration or should be immediately recalibrated, a recalibration engine (e.g. recalibration engine 406) accesses a memory (e.g. memory 500) to select a landmark having a nearest location along a route to be travelled. As another example, the recalibration engine may select a nearest landmark to a current location.

In step 910, if the error handling system determines that the sensor does not require immediate recalibration, the recalibration engine may select a landmark having a highest previous rate of success of recalibration with the sensor. As another example, the recalibration engine may select a landmark having a highest previous rate of success of recalibrations with one or more sensors having a same modality as the sensor. For example, if the sensor is a Lidar sensor, the recalibration engine may select a landmark for which the success rate of recalibrations in all Lidar sensors of the vehicle is highest. For example, if a landmark having a highest previous rate of success of recalibration with the sensor cannot be determined (e.g., no history of sensor) then the recalibration engine selects a landmark for which the success rate of recalibrations in all Lidar sensors of the vehicle is highest. As another example, the recalibration engine may select a landmark for which the overall success rate of recalibrations in all sensors (of all modalities) of the vehicle is highest. As another example, the recalibration engine may select a landmark that, when used for the recalibration, requires a minimum load for the recalibration compared to other landmarks. As another example, the recalibration engine may select a landmark that is based on a most recent recalibration of the sensor, another sensor of a same modality of the sensor, or another sensor of any modality. The recalibration engine may select a landmark if a most recent recalibration used that landmark and was successful. As another example, the recalibration engine may select a landmark having a nearest location compared to other landmarks (e.g. relative to a current location or along a route to be travelled). As another example, the recalibration engine may select a landmark on the basis of any of the aforementioned factors, in response to the error handling system determining that the sensor does not require immediate recalibration.

Figure 10:
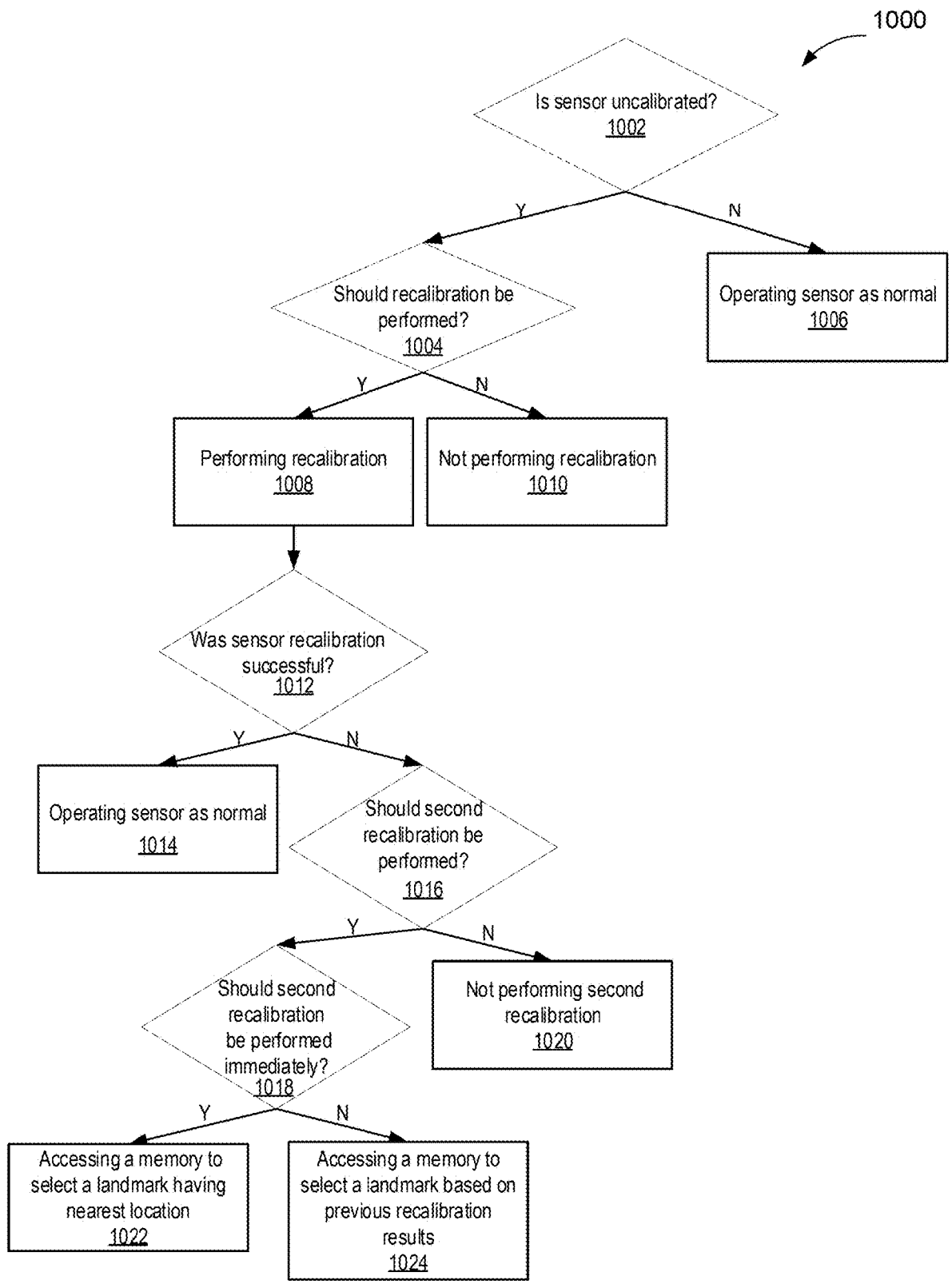
FIG. 10 depicts a flowchart of an example of a recalibration method according to some embodiments.

FIG. 10 depicts a flowchart 1000 of an example of an error handling method of a sensor in a vehicle such as an AV.

In decision 1002, a sensor system (e.g., sensor system 104) determines whether the sensor is uncalibrated, similar to decision 602 as described above in FIG. 6. If the sensor system determines the sensor is uncalibrated, in decision 1004, an error handling system (e.g., error handling system 106) determines whether recalibration should be performed, or is required to be performed, similar to decision 604 as described above in FIG. 6. In step 1006, if the sensor system determines that the sensor is not uncalibrated, the sensor is operated as normal. In step 1008, if the error handling system determines that recalibration should be performed, a recalibration engine (e.g., recalibration engine 406) attempts to perform recalibration. In step 1010, if the error handling system determines that recalibration should not be performed, the recalibration engine does not perform recalibration. In decision 1012, after the recalibration engine attempts to perform recalibration, an analysis engine (e.g. analysis engine 204 of sensor system 104) determines whether the sensor is validated after the recalibration attempt. In step 1014, if the analysis engine determines that the recalibration attempt was successful, then the sensor is operated as normal. In decision 1016, if the analysis engine determines that the recalibration attempt was not successful, the error handling system determines whether a second recalibration should be performed. In decision 1018, if the error handling system determines that the second recalibration should be performed, the error handling system determines whether the second recalibration is to be performed immediately. In step 1020, if the error handling system determines that the second recalibration should not be performed, then the second recalibration is not performed. In step 1022, if the error handling system determines that the second recalibration is to be performed immediately, the recalibration engine attempts to perform a second recalibration by accessing a memory (e.g. memory 500) to select a landmark having a nearest location to a current location or along a travel route. In step 1024, if the error handling system determines that the second recalibration does not require immediate performance, the recalibration engine attempts to perform a second recalibration by accessing the memory to select a landmark based on previous recalibration results. As another example, for example, after decision 1016 or decision 1018, the recalibration engine may select a landmark of a different type for the second recalibration, as a landmark used in the recalibration. For example, if a stop sign was used in the recalibration, the recalibration engine may select a traffic light for the second recalibration.

Figure 11:
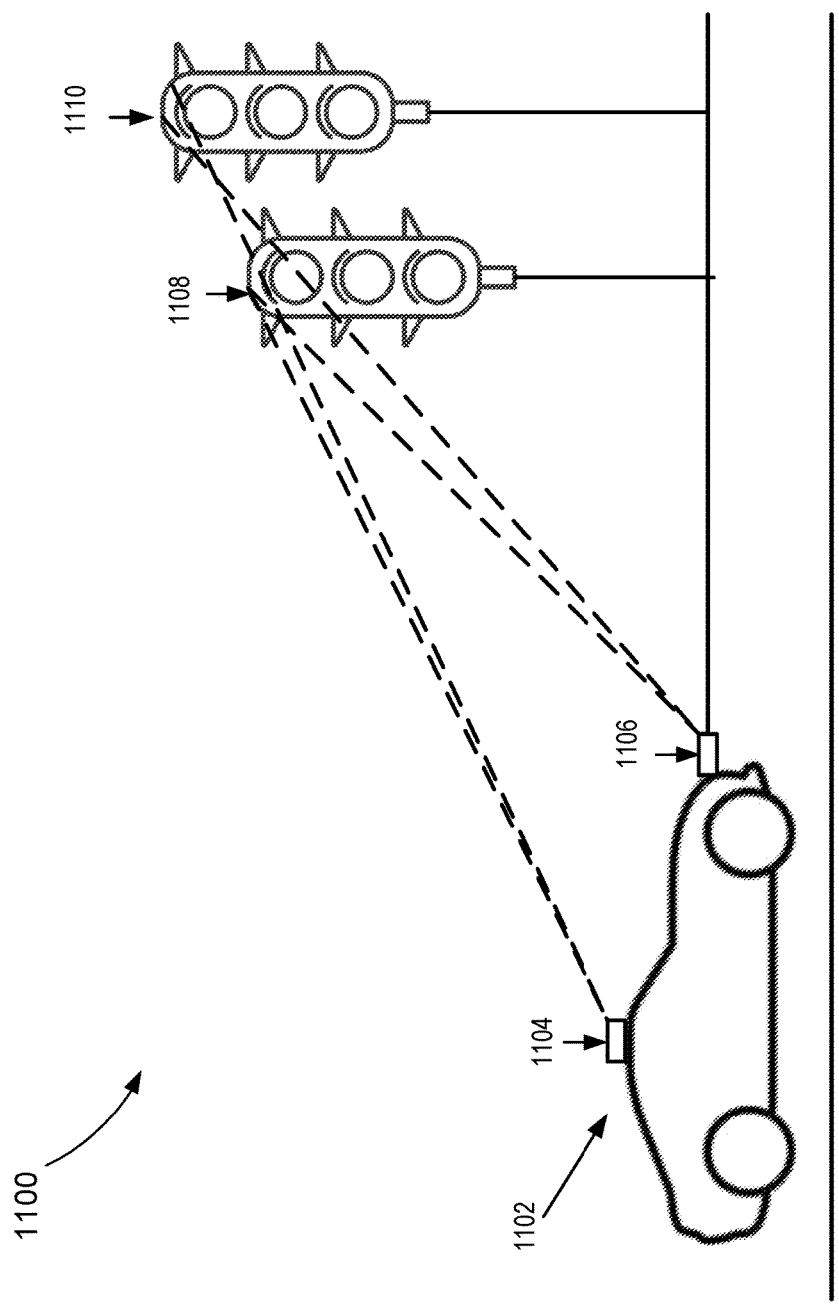
FIG. 11 depicts a vehicle with sensors calibrated in accordance with various embodiments.

FIG. 11 depicts a diagram of an example of a vehicle performing a sensor calibration according to some embodiments.

A vehicle 1102, which may be, as one example, an AV, drives past one or more traffic signs 1108, 1110 located at an intersection or at a section of a road. By way of example, each of the sensors 1104, 1106 may be configured to recognize and detect each of the one or more traffic signs 1108, 1110 as the vehicle 1102 approaches the traffic signs 1108, 1110. The traffic signs 1108, 1110 may then be used as landmarks to recalibrate the sensors 1104, 1106. While this particular example discloses two sensors 1104, 1106 located on the vehicle 1102, it should be noted that any number of sensors may be mounted on the vehicle 1102.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 12:
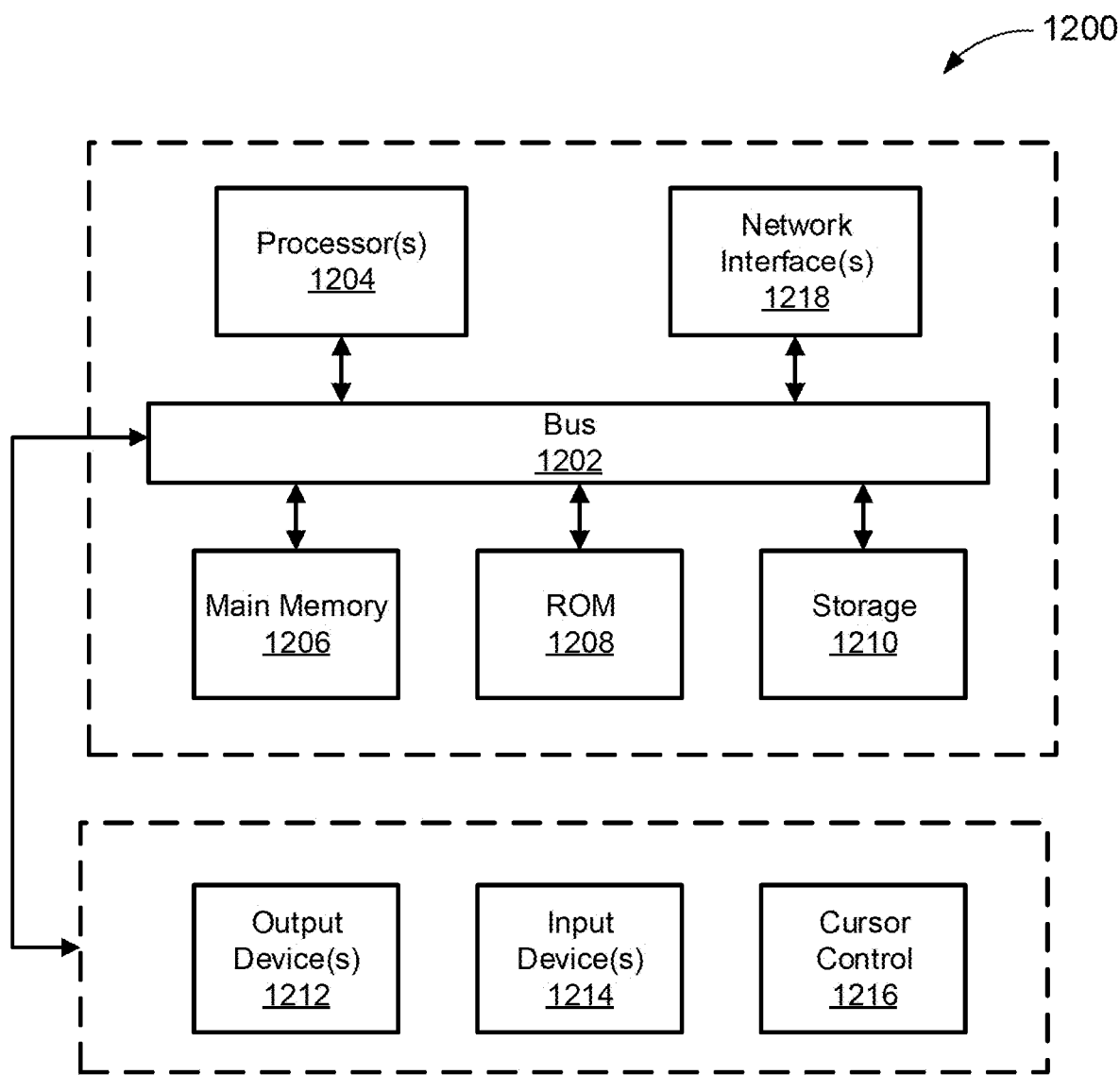
FIG. 12 is a diagram of an example computer system for implementing the features disclosed herein.

FIG. 12 is a block diagram that illustrates a computer system 1200 upon which any of the embodiments described herein may be implemented. The computer system 1200 includes a bus 1202 or other communication mechanism for communicating information, one or more hardware processors 1204 coupled with bus 1202 for processing information. Hardware processor(s) 1204 may be, for example, one or more general purpose microprocessors.

The computer system 1200 also includes a main memory 1206, such as a random access memory (RAM), cache and/or other dynamic storage devices, coupled to bus 1202 for storing information and instructions to be executed by processor 1204. Main memory 1206 also may be used for storing temporary variables or other intermediate information during execution of instructions to be executed by processor 1204. Such instructions, when stored in storage media accessible to processor 1204, render computer system 1200 into a special-purpose machine that is customized to perform the operations specified in the instructions.

The computer system 1200 further includes a read only memory (ROM) 1208 or other static storage device coupled to bus 1202 for storing static information and instructions for processor 1204. A storage device 1210, such as a magnetic disk, optical disk, or USB thumb drive (Flash drive), etc., is provided and coupled to bus 1202 for storing information and instructions.

The computer system 1200 may be coupled via bus 1202 to output device(s) 1212, such as a cathode ray tube (CRT) or LCD display (or touch screen), for displaying information to a computer user. Input device(s) 1214, including alphanumeric and other keys, are coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1200 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor(s) 1204 executing one or more sequences of one or more instructions contained in main memory 1206. Such instructions may be read into main memory 1206 from another storage medium, such as storage device 1210. Execution of the sequences of instructions contained in main memory 1206 causes processor(s) 1204 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1210. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid-state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may retrieves and executes the instructions. The instructions received by main memory 1206 may optionally be stored on storage device 1210 either before or after execution by processor 1204.

The computer system 1200 also includes a communication interface 1218 coupled to bus 1202. Communication interface 1218 provides a two-way data communication coupling to one or more network links that are connected to one or more local networks. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN (or WAN component to communicated with a WAN). Wireless links may also be implemented. In any such implementation, communication interface 1218 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1218, which carry the digital data to and from computer system 1200, are example forms of transmission media.

The computer system 1200 can send messages and receive data, including program code, through the network(s), network link and communication interface 1218. In the Internet example, a server might transmit a requested code for an application program through the Internet, the ISP, the local network and the communication interface 1218.

The received code may be executed by processor 1204 as it is received, and/or stored in storage device 1210, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system comprising:
   a sensor within an autonomous or a semi-autonomous vehicle, the sensor comprising a Lidar, a radar, or a camera;
   and one or more processors configured to:
   determine a frequency of a validation of the sensor, wherein the validation determines whether the sensor is uncalibrated;
   perform the validation at the frequency, wherein the validation comprises a comparison between historical data captured by the sensor and current data captured by the sensor, or a comparison between historical data captured by an other sensor of a same modality as the sensor and the current data captured by the sensor;
   in response to performing the validation, and determining that the sensor is uncalibrated, determining a type or a mode of an error handling procedure based on a frequency of a recalibration error and based on a historical rate of success associated with the type or the mode of the error handling procedure; and
   perform the type or the mode of the error handling procedure.

2. The system of claim 1, wherein the determination of the frequency of the validation is based on at least two of:
   a history of the sensor;
   a density of moving objects previously detected;
   and a weather condition.

3. The system of claim 1, wherein the determination of the frequency of the validation is based on an amount of computation load consumed by performing the validation.

4. The system of claim 1, wherein the determination of the type or mode of the error handling procedure comprises determining whether to perform a recalibration of the sensor based on an availability of a redundant sensor and on traffic and environmental conditions.

5. The system of claim 1, wherein the determination of the type or mode of the error handling procedure comprises determining whether to perform a recalibration of the sensor based on a probability of the sensor being uncalibrated.

6. The system of claim 5, wherein the determination of whether to perform the recalibration comprises eliminating erroneous data if the probability is below a threshold.

7. The system of claim 1, wherein the determination of the type or mode of the error handling procedure comprises determining a type of recalibration based on an identification of a type of a sensor error being of an offset, a sensitivity, or a linearity.

8. The system of claim 1, wherein the validation comprises determining a parameter of the sensor and comparing the parameter to a second threshold, wherein the parameter comprises a skew, a depth of field, an angle of view, a beam angle, or an aspect ratio.

9. The system of claim 1, wherein the performing of the validation comprises determining whether a particular feature captured by the sensor, at successive frames, is increasing or decreasing at a consistent rate.

10. The system of claim 1, wherein the processors are further configured to adjust the frequency of the validation based on an age of the sensor.

11. The system of claim 1, wherein the error handling procedure comprises a sequential series including a first comparison between a sensor parameter of the sensor and a known parameter, a second comparison between the historical data captured by the sensor and the current data captured by the sensor, and a third comparison between the historical data captured by the other sensor of the same modality as the sensor and the current data captured by the sensor.

12. The system of claim 1, wherein the performing the type or the mode of the error handling procedure is based on a landmark or a type of a landmark.

13. The system of claim 1, wherein the performing the type or the mode of the error handling procedure is based on a historical rate of success associated with the type or the mode of the error handling procedure.

14. An error handling method for a sensor of a system, the sensor being within an autonomous or a semi-autonomous vehicle, the sensor comprising a Lidar, a radar, or a camera, the error handling method comprising:
   determining a frequency of a validation of the sensor, wherein the validation determines whether the sensor is uncalibrated;
   performing the validation at the frequency, wherein the validation comprises a comparison between historical data captured by the sensor and current data captured by the sensor, or a comparison between historical data captured by an other sensor of a same modality as the sensor and the current data captured by the sensor;

in response to performing the validation, and determining that the sensor is uncalibrated, determining a type or a mode of an error handling procedure based on a frequency of a recalibration error and based on a historical rate of success associated with the type or the mode of the error handling procedure; and performing the type or the mode of the error handling procedure.

15. The method of claim 14, wherein the determination of the type or mode of the error handling procedure comprises determining whether to perform a recalibration of the sensor based on an availability of a redundant sensor and on traffic and environmental conditions.

16. The method of claim 15, wherein the determination of the type or mode of the error handling procedure comprises determining whether to perform a recalibration of the sensor based on a probability of the sensor being uncalibrated.

17. The method of claim 16, wherein the determination of whether to perform the recalibration comprises eliminating erroneous data if the probability is below a threshold.

18. The method of claim 14, wherein the determination of the type or mode of the error handling procedure comprises determining a type of recalibration based on an identification of a type of a sensor error being of an offset, a sensitivity, or a linearity.

19. The method of claim 14, wherein the performing of the validation comprises determining whether a particular feature captured by the sensor, at successive frames, is increasing or decreasing at a consistent rate.

* * * * *